United States Patent
Soundararajan et al.

(10) Patent No.: US 10,423,422 B2
(45) Date of Patent: Sep. 24, 2019

(54) BRANCH PREDICTOR WITH EMPIRICAL BRANCH BIAS OVERRIDE

(71) Applicant: Intel Corporation, Santa Clara, CA (US)

(72) Inventors: Niranjan K. Soundararajan, Bangalore (IN); Sreenivas Subramoney, Bangalore (IN); Rahul Pal, Bangalore (IN); Ragavendra Natarajan, Mysore (IN)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/383,832

(22) Filed: Dec. 19, 2016

(65) Prior Publication Data

US 2018/0173533 A1   Jun. 21, 2018

(51) Int. Cl.
*G06F 9/38*   (2018.01)

(52) U.S. Cl.
CPC .............. *G06F 9/3848* (2013.01); *G06F 9/38* (2013.01)

(58) Field of Classification Search
None
See application file for complete search history.

(56) References Cited

U.S. PATENT DOCUMENTS

| 2005/0149707 A1* | 7/2005 | Jourdan | G06F 9/3848 712/239 |
| 2007/0083739 A1* | 4/2007 | Glew | G06F 9/3848 712/239 |
| 2010/0306515 A1* | 12/2010 | Al-Otoom | G06F 9/3848 712/240 |
| 2012/0303938 A1* | 11/2012 | Chen | G06F 9/3844 712/240 |
| 2014/0025967 A1* | 1/2014 | Tran | G06F 1/3206 713/320 |
| 2015/0301832 A1* | 10/2015 | Zhang | G06F 9/3861 712/207 |

(Continued)

OTHER PUBLICATIONS

Seznec, André. "A 64 Kbytes ISL-TAGE branch predictor." JWAC-2: Championship Branch Prediction (May 20, 2011); 4 pages.

*Primary Examiner* — George Giroux
(74) *Attorney, Agent, or Firm* — Alliance IP, LLC

(57) ABSTRACT

A processor may include a baseline branch predictor and an empirical branch bias override circuit. The baseline branch predictor may receive a branch instruction associated with a given address identifier, and generate, based on a global branch history, an initial prediction of a branch direction for the instruction. The empirical branch bias override circuit may determine, dependent on a direction of an observed branch direction bias in executed branch instruction instances associated with the address identifier, whether the initial prediction should be overridden, may determine, in response to determining that the initial prediction should be overridden, a final prediction that matches the observed branch direction bias, or may determine, in response determining that the initial prediction should not be overridden, a final prediction that matches the initial prediction. The predictor may update an entry in the global branch history reflecting the resolved branch direction for the instruction following its execution.

20 Claims, 18 Drawing Sheets

(56) References Cited

U.S. PATENT DOCUMENTS

| | | | |
|---|---|---|---|
| 2015/0363203 A1* | 12/2015 | Lipasti | G06F 9/3806 |
| | | | 712/240 |
| 2016/0098279 A1* | 4/2016 | Glew | G06F 9/3012 |
| | | | 712/239 |
| 2017/0090936 A1* | 3/2017 | Al Sheikh | G06F 9/30145 |

* cited by examiner

BRANCH PREDICTOR WITH EMPIRICAL BRANCH BIAS OVERRIDE

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Each processor may include a cache or multiple caches. Processors may be implemented in a system on chip.

DESCRIPTION OF THE FIGURES

Various embodiments of the present disclosure are illustrated by way of example and not limitation in the Figures of the accompanying drawings, in which like references indicate similar elements, and in which.

DETAILED DESCRIPTION

Figure 1A:
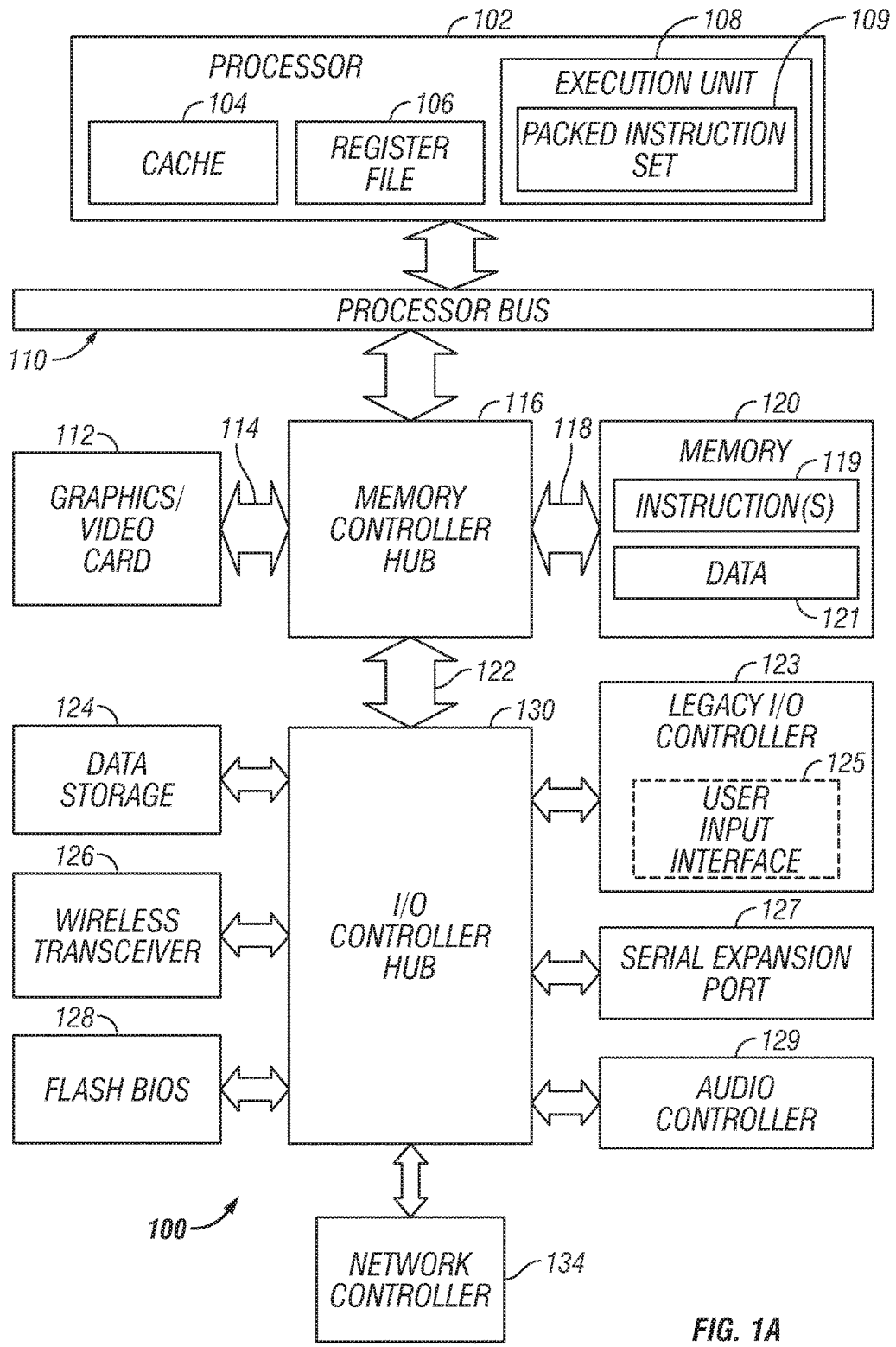
FIG. 1A is a block diagram of an exemplary computer system formed with a processor that may include execution units to execute an instruction, in accordance with embodiments of the present disclosure.

The following description describes an instruction and processing logic for implementing branch prediction with empirical branch bias override. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In some embodiments, functions associated with embodiments of the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS' operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102.

Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

In another example system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
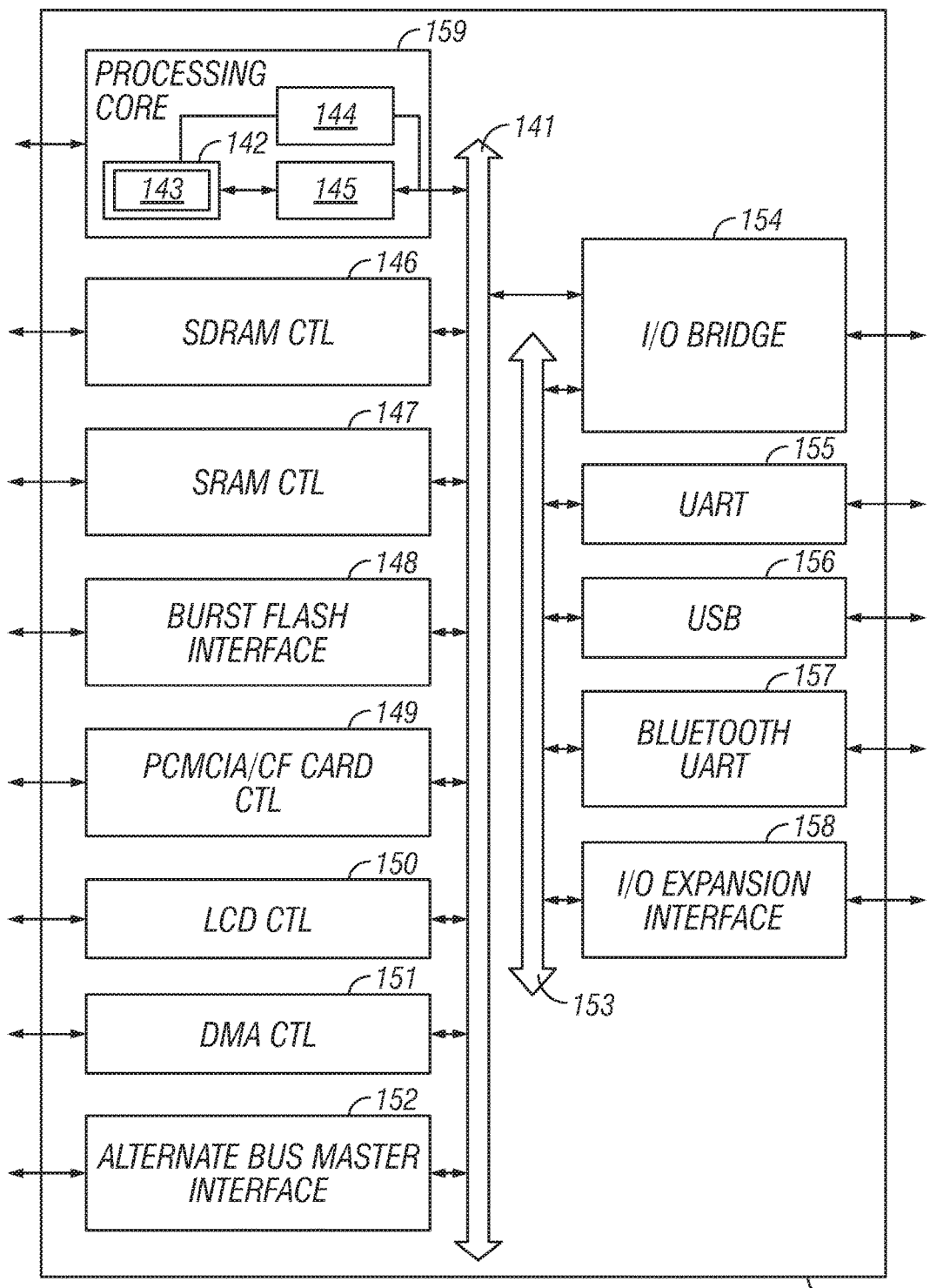
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
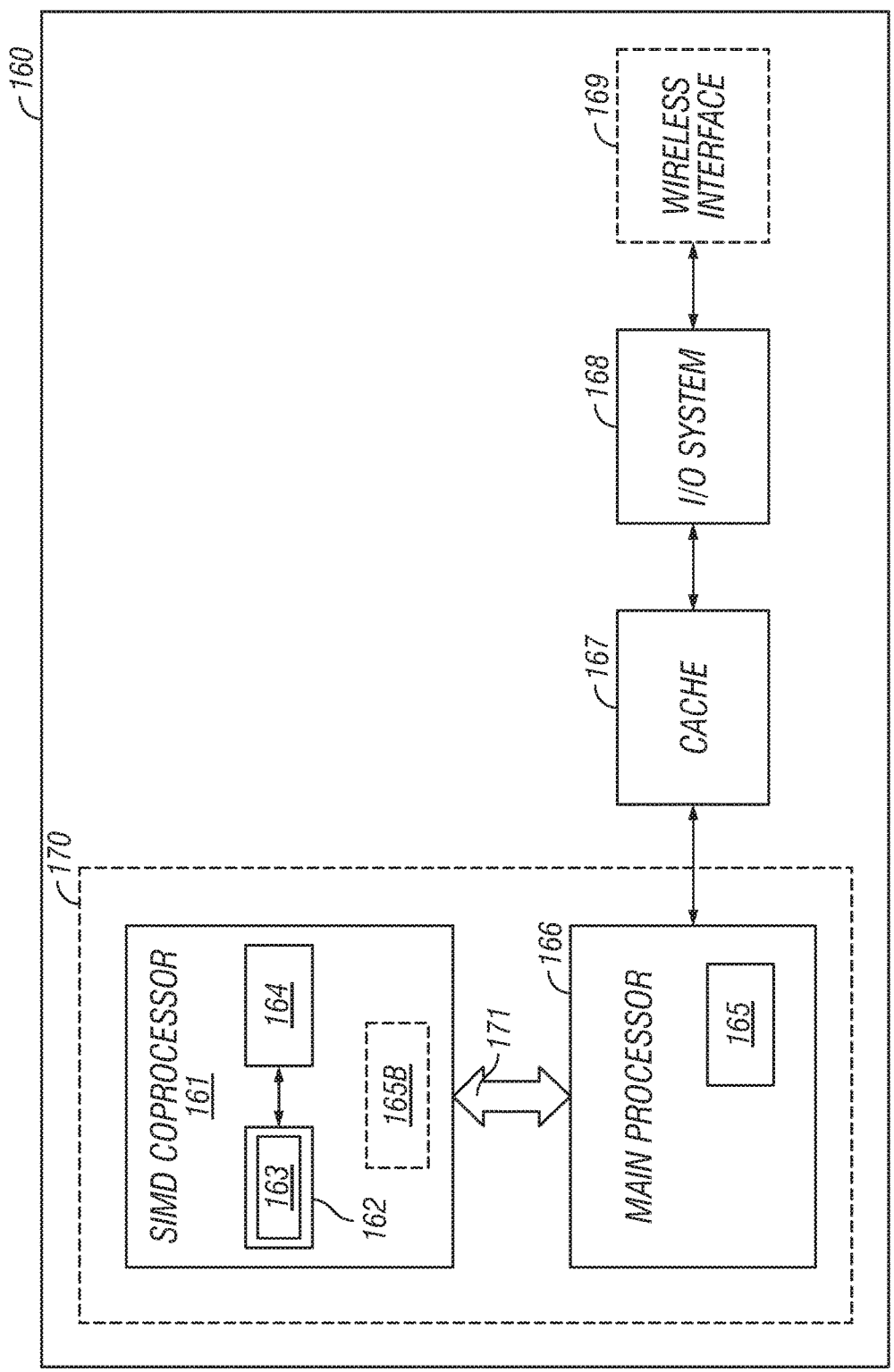
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

As the width and depth of out-of-order pipelines increase, the use of improved branch prediction mechanisms that reduce the number of mispredicted instructions in the pipeline may be increasingly beneficial. This may be especially true in the case of branch prediction mechanisms that reduce the number of mispredicted instructions that enter the pipeline as a result of the misprediction of the direction of conditional branches, as such branches are typically the dominant class among all branch instructions.

Some branch predictors employed within existing processors associate a global history of a branch instruction (which may include a history of the path taken by a series of branches through the currently executing program code to reach the branch instruction) with an address identifier of the branch instruction (such as an instruction pointer value or program counter value associated with the branch instruction). These global-history-based branch predictors typically capture branch direction information, which indicates how often the resolved direction of the branch instruction is taken or not taken, to provide predictions for future instances of the branch instruction. In some cases, the branch predictors within existing processors build up some amount of local branch history for a subset of executed branch instructions. However, once a branch is mispredicted, such branch predictors typically prioritize the global branch history over the local branch history when making their predictions.

In certain applications, for a given conditional branch instruction, there may be periods during which the resolved branch direction for the given branch instruction is not well correlated with a global history maintained by a baseline branch predictor, such as the global-history-based branch predictors described above. Instead, the resolved branch direction for the given branch instruction may be more strongly biased toward a specific direction (either taken or not taken) during particular execution windows than the global history would suggest. These execution windows may extend over the entire lifetime of the branch instruction or may occur only during certain intervals. In some existing branch predictors that employ, or prioritize, a global history to predict the resolved direction of a branch instruction during such execution windows, the performance of the branch predictors, in terms of how often they correctly predict the resolved direction for the branch instruction, might be greatly reduced. Reliance on a global history to make these predictions can also increase the space-pressure in shared global history tables. This, in turn, can increase the rate of cache misses per kilo instruction (MPKI) for these branch instructions, in some cases.

In at least some embodiments of the present disclosure, a branch predictor may include a baseline branch predictor, such as the global-history-based branch predictors described above, and may also include a mechanism to override the decision of that baseline predictor, under certain circumstances, based on an empirical branch direction bias. For example, the branch predictor may include an empirical branch bias override circuit that captures the local bias history of a given branch instruction over an execution window that includes a predetermined number of instances of the given branch instruction. The empirical branch bias override circuit may use this information to determine when and whether to override an initial prediction of the branch direction for instances of the given branch instructions. In at least some embodiments, by overriding an initial prediction of the branch direction generated by a baseline branch predictor during windows in which the resolved branch direction is biased toward a particular direction, the number of mispredictions may be reduced.

As described in more detail herein, a branch predictor with empirical branch bias override may implement a dynamic window-based technique that improves the predication performance of the branch predictor, when compared to a baseline branch predictor alone, for at least some conditional branch instructions for which the baseline branch predictor exhibits poor predictor performance. In some embodiments, a branch predictor with empirical branch bias override may track the observed branch bias, if any, for executed branch instruction instances on a per-address-identifier basis. For example, the branch predictor may include, or have access to, a data structure in a memory that stores branch bias information in multiple entries, each of which is associated with an address identifier, such as an instruction pointer value or program counter value, of a respective branch instruction. This branch bias information may include, among other things, an indication of the direction of an observed branch bias. If, based at least in part on the information stored in the branch bias table, it is determined that the predictor performance of the baseline branch predictor for a given branch instruction is much worse than the performance of the empirical branch bias override circuit in predicting the resolved branch direction of a given branch instruction, the empirical branch bias override circuit may override the initial prediction generated by the baseline branch predictor in favor of the captured direction of the observed branch bias. In at least some embodiments, and for particular branch instructions, this approach may improve the overall rate at which resolved branch directions are correctly predicted. In some cases, this may reduce the MPKI for these branch instructions, which may, in turn, increase the throughput of the system, in terms of instructions per cycle (IPC).

In some embodiments, each time a branch instruction is received at a processor for execution, a branch predictor with empirical branch bias override may determine whether or not information stored in a branch bias table indicates that an initial prediction generated by a baseline branch predictor should be overridden. In some embodiments, regardless of whether or not the initial prediction is overridden, a global history maintained on behalf of the baseline branch predictor may be updated to reflect the actual resolved direction of the branch instruction. In this way, if, subsequent to the identification of a window in which the resolved branch direction is biased toward a particular direction, the behavior of the branch instruction skews back toward its normal behavior (e.g., toward the behavior that the baseline branch predictor would predict), the empirical branch bias override circuit may determine when and whether the predictor performance is improved to a point at which the initial predictions it generates should no longer be overridden.

Unlike some existing branch predictors that include a statistical correlator for identifying branch direction biases, the branch predictors described herein may, in some embodiments, consider the predictor performance of a baseline branch predictor that relies on a global history when deciding when and whether to override the baseline branch predictor based on an empirical branch bias. For example, the branch predictors described herein might not override the baseline branch predictor whenever a branch bias is observed for a given branch instruction, but only under certain conditions. These conditions may be dependent on the number of instances of the given branch instruction that have been executed and on the branch prediction performance of the baseline branch predictor for those executed instances of the given branch instruction. In some embodiments, the branch predictors described herein may update a global history that is maintained by, or on behalf of, a baseline branch predictor even when the final prediction made by the branch predictor (which may be generated by overriding an initial prediction made by the baseline branch predictor) was correct but the initial prediction made by the baseline branch predictor was incorrect. In at least some embodiment, this approach to updating the global history may improve the performance of the branch predictor as a whole more than the use of an existing statistical correlator.

Figure 2:
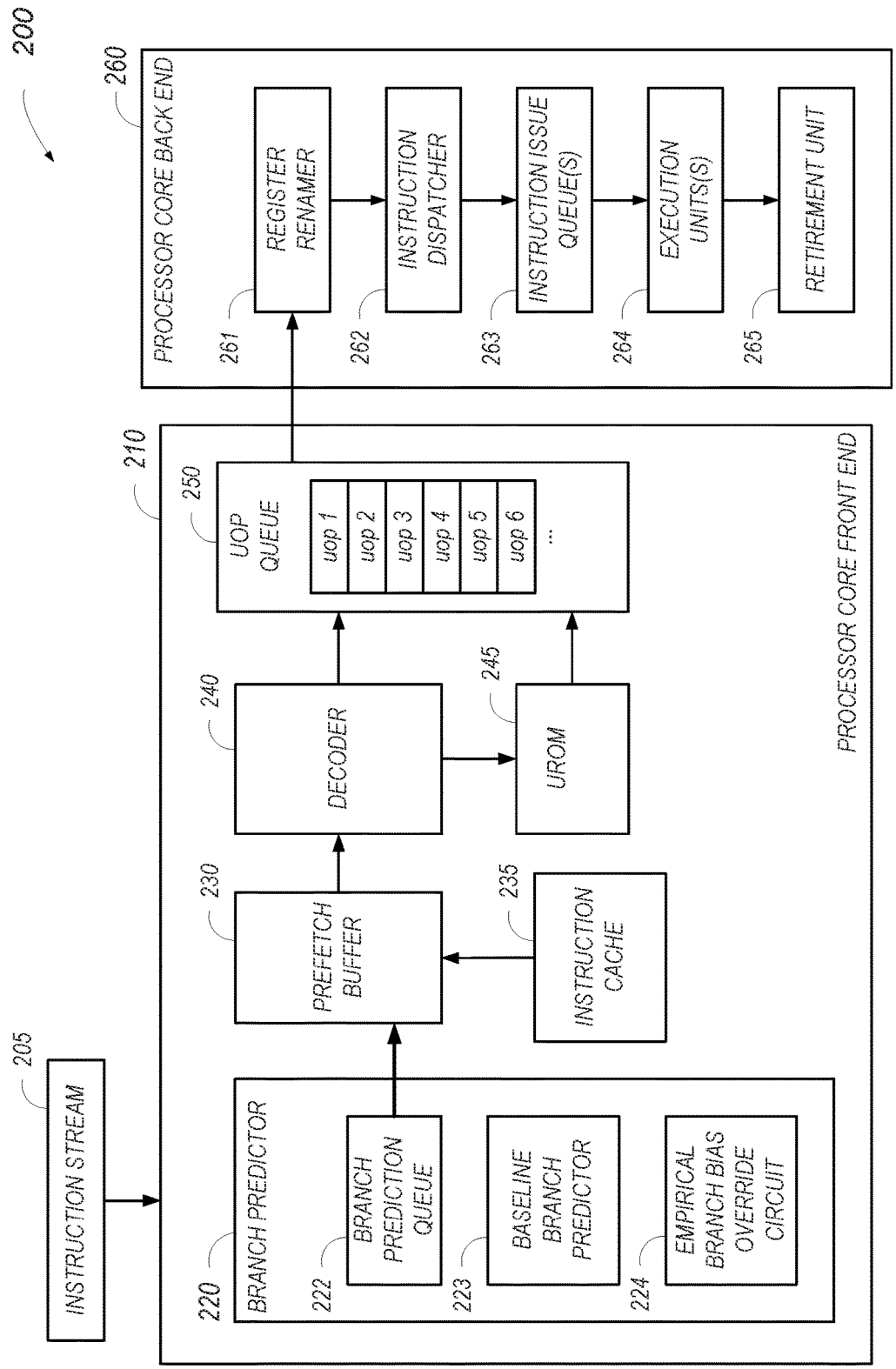
FIG. 2 is a block diagram illustrating a processor core that includes a branch predictor with empirical branch bias override, in accordance with some embodiments of the present disclosure.

FIG. 2 is a block diagram illustrating selected elements of a processor core 200 that includes a branch predictor with empirical branch bias override, according to some embodiments of the present disclosure. Although processor core 200 is shown and described as an example in FIG. 2, any suitable mechanism may be used. For example, some or all of the functionality of processor core 200 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 2. Processor core 200 may include any suitable mechanisms for performing branch prediction with empirical branch bias override. In at least some embodiments, such mechanisms may be implemented in hardware. For example, in some embodiments, some or all of the elements of processor core 200 illustrated in FIG. 2 and/or described herein may be implemented fully or in part using hardware circuitry. In some embodiments, this circuitry may include static (fixed-function) logic devices that collectively implement some or all of the functionality of processor core 200. In other embodiments, this circuitry may include programmable logic devices, such as field programmable logic gates or arrays thereof, that collectively implement some or all of the functionality of processor core 200. In still other embodiments, this circuitry may include static, dynamic, and/or programmable memory devices that, when operating in conjunction with other hardware elements, implement some or all of the functionality of processor core 200. For example, processor core 200 may include a hardware memory having stored therein instructions which may be used to program processor core 200 to perform one or more operations according to some embodiments of the present disclosure. Embodiments of processor core 200 are not limited to any specific combination of hardware circuitry and software. Processor core 200 may be implemented fully or in part by the elements described in FIGS. 1A-1C or FIGS. 7-14.

In one embodiment, processor core 200 may receive instructions for execution as an instruction stream 205. In one embodiment, processor core 200 may include a front end 210 to fetch and decode the instructions and a back end 260 to receive and execute the decoded instructions. Front end 210 may include a branch predictor 220, which may include a baseline branch predictor 223 and empirical branch bias override circuit 224. In some embodiments, branch predictor 220 may include a branch prediction queue 222. Data elements stored in each entry of predication queue 222 may represent instruction pointer values or program counter values that identify, or are otherwise associated with, a respective branch instruction. In one embodiment, branch prediction queue 222 may include storage for up to eight entries. In other embodiments, branch prediction queue 222 may store another number of entries. Branch predictor 220 may also include other elements required to perform branch prediction, such as hardware circuitry to implement branch prediction, including baseline branch predictor 223 and empirical branch bias override circuit 224, one or more other buffers or queues (including a branch target buffer), or other hardware circuitry (not shown).

As illustrated FIG. 2, in some embodiments, front end 210 may include a prefetch buffer 230 to store data elements representing undecoded instructions to be decoded by decoder 240. Front end 210 may also include an instruction cache 235. In one embodiment, instruction cache 235 may include storage for up to 32K bytes of data representing undecoded instructions. In other embodiments, instruction cache 235 may include storage for more or fewer entries. In some embodiments, instruction-related data elements representing undecoded instructions may be provided to the prefetch buffer 230 for subsequent decoding by decoder 240 from instruction cache 235.

In some embodiments, data elements including branch-related information about undecoded instructions to be decoded by front end 210 may be provided to prefetch buffer 230 from branch prediction queue 222 for use in subsequent decoding operations to be performed by decoder 240. In one embodiment, branch predictor 220 may include hardware circuitry to determine the data elements to be included in branch prediction queue 222. In one embodiment, this information may be used to determine which data elements in instruction cache 235 are to be directed to prefetch buffer 230.

In some embodiments, front end 210 may include a microcode ROM (shown as uROM 245) that stores data elements representing micro-operations (uops) for performing various ones of the instructions received in the input instruction stream 205. In some embodiments, decoder 240 may include hardware circuitry to decode multiple ones of the data elements in prefetch buffer 230 in parallel. In some cases, the decoding operation may include generating one or more uops for each decoded data element. In other cases, the decoding operation may include obtaining one or more uops for each decoded data element from uROM 245, e.g., if a result of a previous decoding operation for the same instruction is available in uROM 245.

In some embodiments, front end 210 may include a queue 250 into which the outputs of decoder 240 are directed. In this example, queue 250 stores decoded instructions in the form of micro-operations (uops). In some embodiments, the decoding of each of the data elements of prefetch buffer 230 by decoder 240 may generate a single uop in queue 250. In other embodiments, for at least some of the data elements that are directed to decoder 240, the decoding may generate two or more uops in queue 250. As illustrated this example, as a result of a decoding operation, uops may be directed to queue 250 from decoder 240 itself, or from uROM 245, depending on whether or not a result of a previous decoding operation for the same instruction is available in uROM 245.

In some embodiments, the outputs of decoder 240 may be provided to queue 250 as an ordered sequence of decoded instructions. The order of the decoded instructions in the sequence of decoded instructions may reflect the program order of the corresponding undecoded instructions that were directed to the decoder 240 through prefetch buffer 230. Subsequently, the in-order sequence of decoded instructions may be provided to an allocation and register renaming stage (shown as register renamer 261) of a processor core back end 260. In some embodiments, register renamer 261 may include a reorder buffer. In some embodiments, processor core back end 260 may also include an instruction dispatcher 262 to schedule and/or dispatch various ones of the decoded instructions to respective instruction issue queues 263. Each of the instruction issue queues may provide decoded instructions to a respective execution unit 264 to execute the instructions. Processor core back end 260 may also include a retirement unit 265, which may implement a write-back to memory of the results of executing the decoded instructions.

As described in more detail below, baseline branch predictor 223 may determine an initial prediction of the branch direction for branch instructions in the input instruction stream 205. In some embodiments, baseline branch predictor 223 may determine the initial predictions based, at least in part, on a global branch history. Empirical branch bias override circuit 224 may determine, based on an observed bias in the resolved direction for a collection of the most recently retired instances of particular branch instructions, that the initial prediction of the branch direction should be overridden in favor of the observed bias.

As noted above and described in more detail below, in at least some embodiments of the present disclosure, the branch predictors described herein may take the predictor performance of a baseline branch predictor into account and may only override an initial prediction made by the baseline branch predictor under specific conditions. By using this approach, these branch predictors may avoid mispredictions based on an observed branch direction bias when the baseline branch predictor is performing well. In at least some embodiments, by updating a baseline branch predictor even when the final prediction made by the branch predictor (which may be generated by overriding an initial prediction made by the baseline branch predictor) was correct but the initial prediction made by the baseline branch predictor was incorrect, the branch predictors described herein may avoid continuing to mispredict the resolved direction for future instances of the given branch based on an outdated branch state (which would have wasted pipeline resources). In some embodiments, by employing both of these approaches, the quality of the predictions made by the baseline branch predictor may be improved in the presence of strong statistical bias, when compared to existing branch predictors that employ a statistical correlator.

Figure 3A:
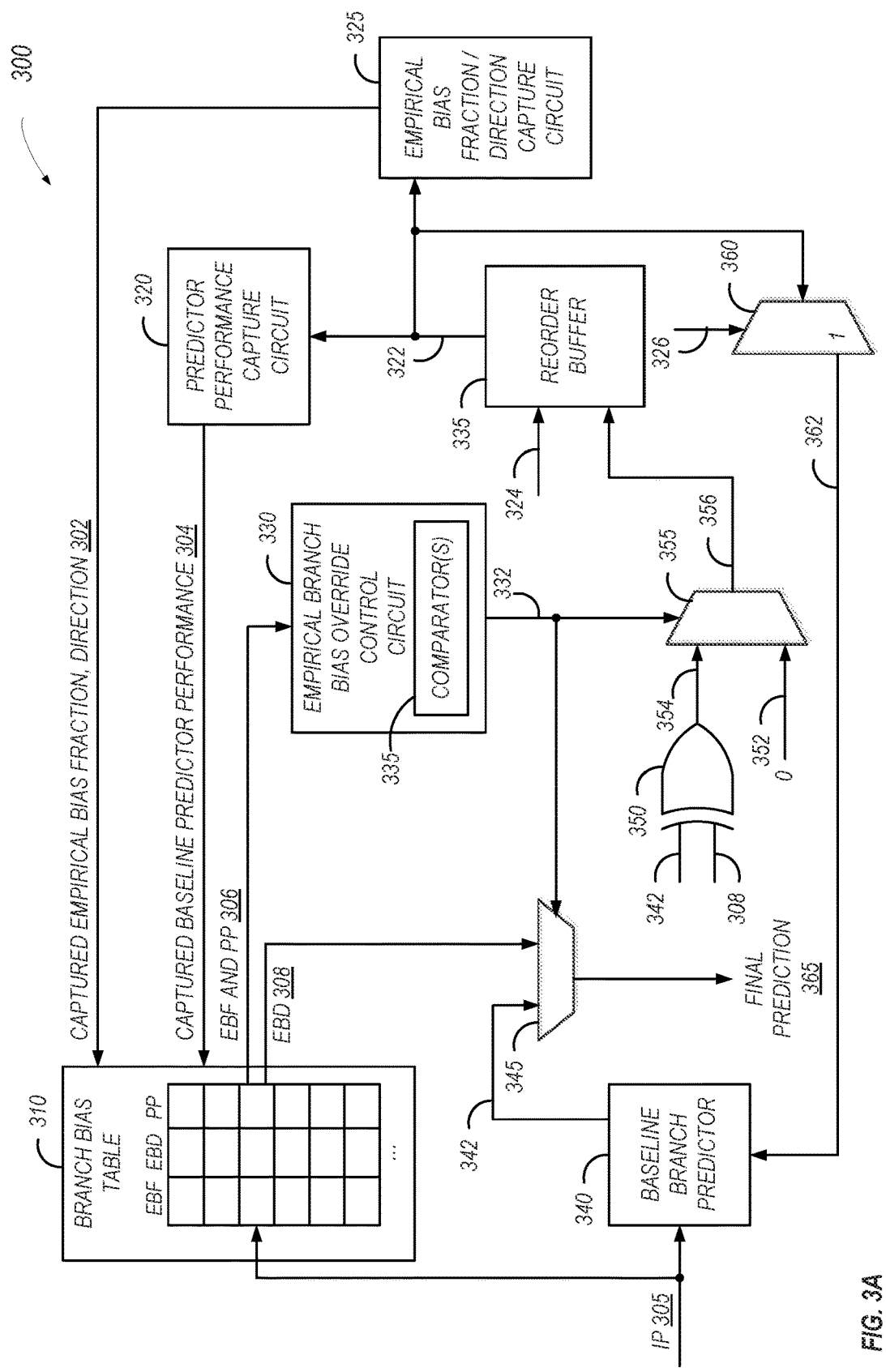
FIGS. 3A-3C are block diagrams illustrating portions of a processor core that implement branch prediction with empirical branch bias override, in accordance with some embodiments of the present disclosure.
Figure 3B:
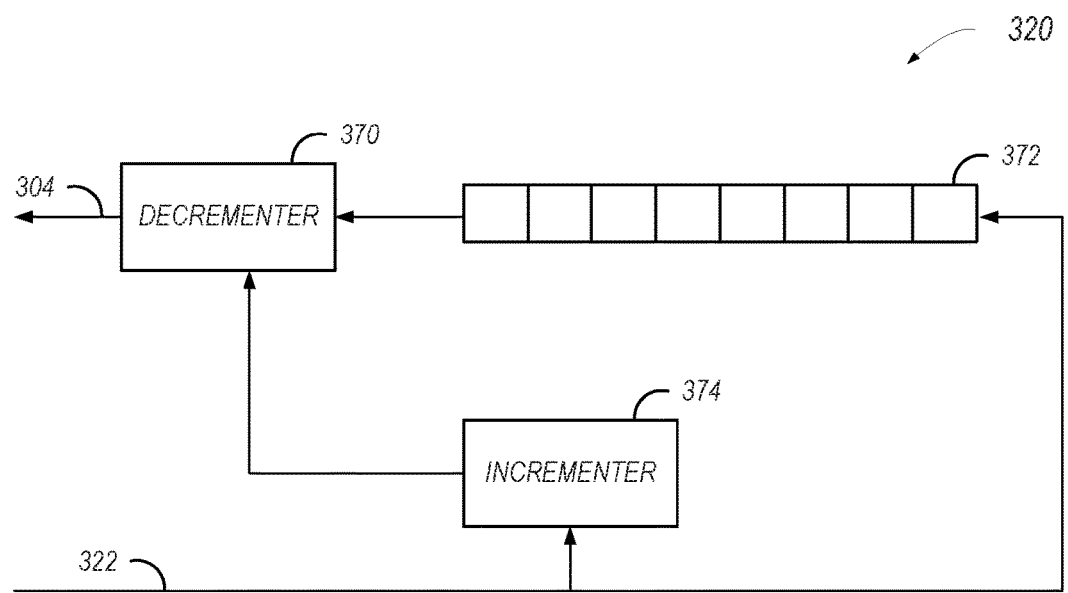
Figure 3C:
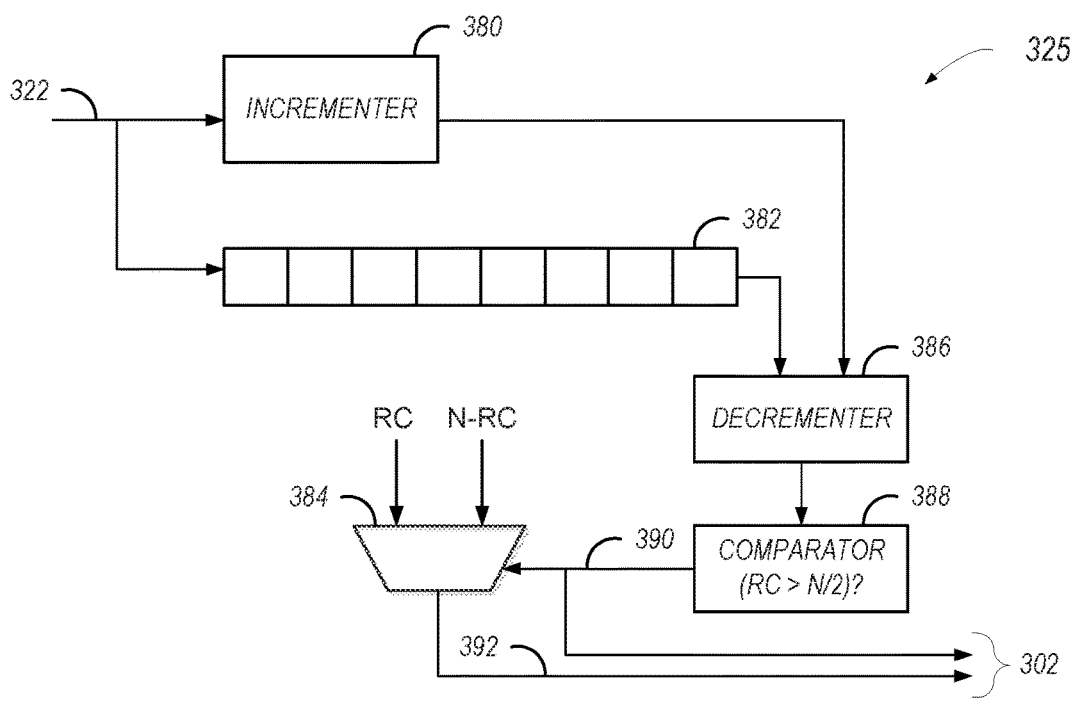

FIGS. 3A-3C are a block diagrams illustrating portions of a processor core 300 that implement branch prediction with empirical branch bias override, in accordance with some embodiments of the present disclosure. In some embodiments, some or all of the elements of processor core 300 illustrated in FIGS. 3A-3C and/or described herein may be implemented fully or in part using hardware circuitry. In some embodiments, this circuitry may include static (fixed-function) logic devices that collectively implement some or all of the functionality of processor core 300. In other embodiments, this circuitry may include programmable logic devices, such as field programmable logic gates or arrays thereof, that collectively implement some or all of the functionality of processor core 300. In still other embodiments, this circuitry may include static, dynamic, and/or programmable memory devices that, when operating in conjunction with other hardware elements, implement some or all of the functionality of processor core 300. For example, processor core 300 may include a hardware memory having stored therein instructions which may be used to program processor core 300 to perform one or more operations according to some embodiments of the present disclosure. Embodiments of processor core 300 are not limited to any specific combination of hardware circuitry and software. Processor core 300 may be implemented fully or in part by the elements described in FIGS. 1A-2 or FIGS. 7-14.

As illustrated in FIG. 3A, processor core 300 may include a baseline branch predictor 340. In some embodiments, baseline branch predictor 340, which may be similar to baseline branch predictor 223 illustrated in FIG. 2, may include circuitry to determine an initial prediction of the branch direction for branch instructions based, at least in part, on a global branch history. For example, baseline branch predictor 340 may receive as input branch instructions 305, each of which is associated with an instruction pointer (IP) value or a program counter value. For each received branch instruction, baseline branch predictor 340 may output an initial prediction of the direction for that branch instruction, shown as initial prediction 342. In some embodiments, baseline branch predictor 340 may include a global history table. In various embodiments, the global history table may be implemented by any suitable data structure in a memory that is maintained by, or on behalf of, baseline branch predictor 340. In other embodiments, the global history table may be implemented using another type of programmable logic circuit that is configured to store data. For at least some branch instructions, baseline branch predictor 340 may, upon retirement of the branch instruction, receive as input an update signal 362 for updating the global history in accordance with the resolved directions of the branch instruction. Processor core 300 may also include a reorder buffer 335. In some embodiments, reorder buffer 335 may be a component of an allocation and register renaming stage of a processor core back end, such as register renamer 261 illustrated in FIG. 2.

In some embodiments, processor core 300 may include hardware circuitry to implement an empirical branch bias override function. For example, multiple elements of processor core 300 illustrated in FIGS. 3A-3C may work together to control whether and when an initial prediction of the branch direction for various branch instruction instances made by a baseline branch predictor should be overridden. These elements may collectively be referred to as an empirical branch bias override circuit. This empirical branch bias override circuit, which may be similar to empirical branch bias override circuit 224 illustrated in FIG. 2, may detect a bias in the resolved direction for a collection of the most recently retired instances of particular branch instructions. Under certain conditions, the empirical branch bias override circuit may determine that the initial prediction of the branch direction should be overridden in favor of the observed bias in the resolved direction. In some embodiments, one or more of the elements that collectively perform empirical branch bias override may reside in a component of processor core 300 other than the front end of the processor core. For example, while some of the elements that collectively perform empirical branch bias override may reside in a branch predictor in the front end of the processor core, such as branch predictor 220 illustrated in FIG. 2, other elements may reside in a retirement stage of the processor core, such as retirement unit 265 illustrated in FIG. 2. In some embodiments, a retirement stage of the processor core may provide inputs to an empirical branch bias override circuit within a branch predictor to inform decisions about whether and when an initial prediction of a branch direction made by a baseline branch predictor should be overridden.

In at least some embodiments, processor core 300 may include a branch bias table 310, an empirical branch bias override control circuit 330, a predictor performance capture circuit 320, and an empirical bias fraction and direction capture circuit 325, each of which may perform some of the functionality of an empirical branch bias override circuit. Processor 300 may also include other hardware circuit elements to control the operation of the empirical branch bias override circuit, including multiplexers 345 and 355, demultiplexer 360, and exclusive-OR gate 350. In some embodiments, multiplexer 345 may, based on the output of empirical branch bias override control circuit 330 (shown as 332 in FIG. 3A), select as the final prediction of the branch direction (shown as output 365) either the initial prediction 342 made by the baseline branch predictor 340, or an empirical bias direction determined by the empirical branch bias override circuit for the branch instruction, shown as 308. In some embodiments, this final prediction 365 may control, at least in part, which instructions of the input instruction stream, including those that may potentially follow the branch instruction in the execution pipeline, are provided to a prefetch buffer of the processor core, such as prefetch buffer 230 illustrated in FIG. 2, from a branch prediction queue, such as branch prediction queue 222 illustrated in FIG. 2, or from an instruction cache, such as instruction cache 235 illustrated in FIG. 2.

In various embodiments, branch bias table 310 may be implemented by any suitable data structure in a memory that is maintained by, or on behalf of, an empirical branch bias override circuit within a branch predictor. In other embodiments, the global history table may be implemented using another type of programmable logic circuit that is configured to store data. In at least some embodiments, each entry in the branch bias table 310 may be associated with a respective branch instruction and may store data about that branch instruction in multiple fields. In one embodiment, the data stored in a first field of each entry may represent the empirical bias fraction (EBF) for the branch instruction. The value stored in this field may indicate the fraction of instances of the branch instruction within a most recent window of a predetermined size that resolved as taken or the fraction of instances of the branch instruction within the window that resolved as not taken, whichever is greater. In one embodiment, the data stored in a second field of each entry of branch bias table 310 may represent the empirical bias direction (EBD) for the branch instruction. The value stored in this field may indicate the direction of the observed branch bias. For example, if the branch direction for the most recent instances of the branch instruction are biased towards taken, the value stored in the EBD field may be 1, while if the branch direction for the most recent instances of the branch instruction are biased towards not taken, the value stored in the EBD field may be 0. In one embodiment, the data stored in a third field of each entry of branch bias table 310 may represent the baseline predictor performance (PP) for the branch instruction. The value stored in this field may indicate the fraction of the instances of the branch instruction for which the baseline branch predictor correctly predicted the branch direction. In at least some embodiments of the present disclosure, each entry in the branch bias table may be indexed by the address identifier associated with a respective branch instruction for which the entry stores branch bias information. In some embodiments, the branch bias table may be implemented as a fully associative data structure in which branch bias information for a branch instruction associated with a given address identifier can be accessed in the structure by searching for the given address identifier.

In at least some embodiments, if there is a large difference between the empirical bias fraction and the predictor performance of the baseline branch predictor for a given branch instruction within a given execution window, and the empirical bias fraction is greater than the predictor performance of the baseline branch predictor, this may indicate a situation in which there is an opportunity to improve the overall prediction performance of a branch predictor through the use of empirical branch bias override. However, when the predictor performance of the baseline branch predictor for a given branch instruction exceeds the empirical bias fraction for the given branch instruction, or when the empirical bias fraction exceeds the predictor performance by only a small amount, this may indicate a situation in which there is little opportunity to improve the overall prediction performance of a branch predictor through the use of empirical branch bias override. The difference between the empirical bias fraction and the predictor performance may, therefore, represent a measurement of the potential to improve the overall prediction performance by applying empirical branch bias override, and may serve as a guide for the aggressiveness with which to apply the override mechanism.

In some embodiments, upon retirement of a branch instruction instance, an indication 324 of whether the final prediction 365 for the branch instruction instance correctly predicted the resolved branch direction for the branch instruction instance or resulted in a misprediction of the resolved branch direction may be provided to the reorder buffer as an input. For example, input 324 may be set to 1 if the resolved branch direction was mispredicted, and may be set to 0 if it was not mispredicted. In addition, an empirical branch bias override (EBO) indicator 356, indicating whether or not the initial prediction 342 for the branch instruction was overridden, may be provided to the reorder buffer as an input. The reorder buffer 335 may provide this information, along with an indication of whether the resolved branch direction was taken or not taken (shown collectively as 322 in FIGS. 3A-3C), to predictor performance capture circuit 320.

In some embodiments, predictor performance capture circuit 320 may include hardware circuitry to capture the predictor performance (PP) value for a given branch instruction as a fraction of the total number of instances of the given branch instruction for which the resolved direction was correctly predicted. One example embodiment of a predictor performance capture circuit 320 is illustrated in FIG. 3B. As discussed above, the inputs 322 provided to predictor performance capture circuit 320 may include an empirical branch bias override (EBO) indicator 356, indicating whether or not the initial prediction 342 for the branch instruction was overridden, an indication of whether or not the resolved branch direction was mispredicted, and an indication of whether the resolved branch direction was taken or not taken. In some embodiments, the EBO indicator 356 may help identify the source of the final branch prediction, which may be used in capturing the predictor performance of the baseline branch predictor.

In some embodiments, if the EBO indicator 356 is set and the resolved branch direction was mispredicted (324 is set), this means that the initial prediction made by the baseline branch predictor was correct. Conversely, if the EBO indicator 356 is set and the resolved branch direction was not mispredicted (324 is not set), this means that the initial prediction made by the baseline branch predictor was incorrect. In some embodiments, if the EBO indicator 356 is not set and the resolved branch direction was mispredicted (324 is set), this means that the initial prediction made by the baseline branch predictor was incorrect. Conversely, if the EBO indicator 356 is not set and the resolved branch direction was not mispredicted (324 is not set), this means that the initial prediction made by the baseline branch predictor was correct.

In some embodiments, once it has been determined, based on the EBO indicator 356 and the indication 324 of whether or not the resolved branch direction was mispredicted (MP), whether the initial prediction made by the baseline branch predictor was correct or incorrect, the predictor performance of the baseline branch predictor may be captured. As illustrated in FIG. 3B, in some embodiments, the predictor performance capture circuit 320 may include an incrementer 374 and a decrementer 370 to count the number of initial predictions that were correct over a sliding execution window. In some embodiments, the functionality of incrementer 374 and decrementer 370 may be implemented in a combination incrementer/decrementer. In one embodiment, the predictor performance capture circuit 320 may include one or more comparators, inverters, or other logic circuits whose outputs control the operation of shift register 372, incrementer 374, and/or decrementer 370. For example, in one embodiment, a signal representing the evaluation of the expression ((!EBO AND !MP) OR (EBO AND MP)) may, when true, may cause an increment of a count of the number of initial predictions that were correct by incrementer 374. When this signal is false, it may cause a decrement of the count of the number of initial predictions that were correct. In one embodiment, the sliding execution window may be established using a shift register 372 that stores some or all of the inputs to predictor performance capture circuit 320 for each of the last N branch instructions, where N is a predetermined window size. After the evaluation of the expression ((!EBO AND !MP) OR (EBO AND MP)) for a given retired branch instruction, the contents of shift register 374 may be shifted to the left, and data representing this signal, whether or not it evaluates to true, may be stored in a lowest-order position of shift register 374 (i.e., the right-most position of shift register 374, in this example).

Data representing the captured baseline predictor performance for the branch instruction (shown as 304 in FIG. 3A) may be stored in a predictor performance field of an entry associated with that branch instruction in branch bias table 310. In some embodiments, the entry associated with the branch instruction may be accessed using an index value that is dependent on an address identifier associated with the branch instruction, such as an instruction pointer value or a program counter value associated with the branch instruction.

In some embodiments, the reorder buffer 335 may also provide an indication of whether the resolved branch direction was taken or not taken (shown within 322) to empirical bias fraction and direction capture circuit 325. In some embodiments, empirical bias fraction and direction capture circuit 325 may include hardware circuitry to capture the empirical bias fraction and the empirical bias direction for the N most recent instances of a given branch instruction, where N represents the size of the sliding window. One example embodiment of empirical bias fraction and direction capture circuit 325 is illustrated in FIG. 3C. In some embodiments, at retirement, a shift register within empirical bias fraction and direction capture circuit 325, shown as shift register 382, may be used to capture the resolved direction as taken or not taken (T/NT) for the N most recent instances of a given branch instruction. Over the current sliding execution window, if the branch is taken more often than it is not, the EBD indicator 390 may be set to 1. Otherwise EBD indicator 390 may be set to 0. In some embodiments, an incrementer 380 and a decrementer 386 within empirical bias fraction and direction capture circuit 325 may be used to count the number of times that the resolved branch direction is taken, within the window, which may be referred to as the retirement count (RC). For example, in one embodiment, every time a branch is taken, a counter associated with the address identifier for the corresponding branch instruction may be incremented by incrementer 380. In some embodiments, the count may be adjusted by decrementer 386 based on the values stored in shift register 382 are shifted out. In some embodiments, the functionality of incrementer 380 and decrementer 386 may be implemented in a combination incrementer/decrementer. In the example embodiment illustrated in FIG. 3C, the empirical bias fraction and direction capture circuit 325 includes a multiplexer, shown as mux 384, that selects as the value of the empirical bias fraction indicator 392 either a value equal to the retirement count (RC) or value equal to (N−RC).

In one embodiment, if, as determined by a comparator 388, the RC value is greater than half the window size, this may indicate that the branch instruction is more biased towards taken. Therefore, the EBD indicator 390 may have a value of true (or 1), and EBD indicator for the given branch instruction in a corresponding entry in the branch bias table 310 may be set to 1. In this case, the value of the EBF indicator 392, and the EBF field for the corresponding entry in branch bias table 310, may be set to the RC value. Otherwise, the EBD indicator may be set to 0, and the value of the EBF field may be calculated as (window size (N)−RC). Using this approach, the value of the EBF may always capture the amount by which the branch is biased towards taken or not taken, and the EBD indicator may capture the direction of the bias. Data representing the captured empirical bias fraction 392 and captured empirical bias direction 390 for the branch instruction (shown collectively as 302 in FIG. 3A and in FIG. 3C) may be stored in respective fields of an entry associated with that branch instruction in branch bias table 310. In some embodiments, the entry associated with the branch instruction may be accessed using an index value that is dependent on an address identifier associated with the branch instruction, such as an instruction pointer value or a program counter value associated with the branch instruction.

In some embodiments, some of the functionality described above as being performed at retirement of a branch instruction may be implemented by hardware circuitry within a retirement unit of a processor core back end, such as retirement unit 265 illustrated in FIG. 2. In other embodiments, a retirement unit, such as retirement unit 265, may provide information about a retired branch instruction to an empirical branch bias override circuit within a branch predictor as inputs to the functions performed at retirement of a branch instruction.

In some embodiments, empirical branch bias override control circuit 330 may, based on the empirical bias fraction (EBF) and baseline predictor performance (PP) values associated with a given branch instruction, determine whether or not to override an initial prediction 342 that was made by baseline branch predictor 340 for a particular instance of the given branch instruction. The inputs to empirical branch bias override control circuit 330 may include the empirical bias fraction (EBF) and baseline predictor performance (PP) for the branch instruction (shown as 306 in FIG. 3A), each of which may be obtained from an entry for the branch instruction in branch bias table 310. In at least some embodiments, empirical branch bias override control circuit 330 may include one or more comparators 335 whose output(s) determine whether or not an initial prediction 342 should be overridden. The output of empirical branch bias override control circuit 330 may indicate whether or not the initial branch prediction 342 that was made by baseline branch predictor 340 should be overridden by the empirical branch direction 308 obtained from the entry for the branch instruction in branch bias table 310. In one example embodiment, if the difference between the empirical bias fraction (EBF) and baseline predictor performance (PP) for the branch instruction exceeds a predetermined performance difference threshold (PPDT), the initial prediction made by the baseline prediction for the given branch instruction may be overridden by the empirical bias direction, if they are not the same. In this example embodiment, the empirical branch bias override control circuit 330 may include a comparator 335 to evaluate whether or not the expression ((EBF−PP)>PPDT) is true.

In some embodiments, this decision about whether to override the initial prediction 342 may also be dependent on whether or not the initial prediction 342 and the empirical bias direction 308 identify the same direction. For example, the inputs to XOR gate 350 include the initial branch prediction 342 that was made by baseline branch predictor 340 and the empirical branch direction 308 obtained from the entry for the branch instruction in branch bias table 310. If these values are different, meaning that the direction of an observed branch bias is different than the initial branch prediction, the output of XOR gate 350 (shown as 354) will be 1. Otherwise, the output of XOR gate 350 (shown as 354) will be 0. The output of XOR gate 350 (shown as 354) may be provided as an input to multiplexer 355.

In the example embodiment illustrated in FIG. 3A, the output of multiplexer 355 (shown as EBO indicator 356) may be selected from the output of XOR gate 350 (which indicates whether or not the direction of an observed branch bias is different than the initial branch prediction) and an input 352 that is hardwired to a value of 0, based on the output of empirical branch bias override control circuit 330. In other words, only if control circuit 330 indicates that the initial prediction should be overridden and the empirical bias direction and initial prediction indicate different directions, is the initial prediction actually overridden. In the example embodiment illustrated in FIG. 3A, a demultiplexer 360 takes as input the resolved direction for the branch instruction instance, and outputs (at 362) this direction or a value of 1, depending on the state of control signal 326. In this example, control signal 326 is true (or 1) when the EBO indicator 356 is set and the indication 324 of whether or not the resolved branch direction was mispredicted is not set. The output of demultiplexer 360 (shown as update indicator 362) may be provided to baseline branch predictor 340 to indicate whether or not the baseline branch predictor 340 should be updated.

In some embodiments, the empirical branch bias override circuit within a branch predictor may include multiple instances of at least some of the components illustrated in FIGS. 3A-3C to support branch prediction with empirical branch bias override for instances of branch instructions associated with multiple respective address identifiers. For example, the empirical branch bias override circuit may include a respective counter for each such address identifier to count the number of executed instances of the associated branch instruction. In another example, the empirical branch bias override circuit may include a respective counter for each such address identifier to count the number of times the resolved branch direction for executed instances of the associated branch instruction were correctly predicted. In yet another example, the empirical branch bias override circuit may include a respective counter for each such address identifier to count the number of times the resolved branch direction for executed instances of the associated branch instruction was taken.

Figure 4:
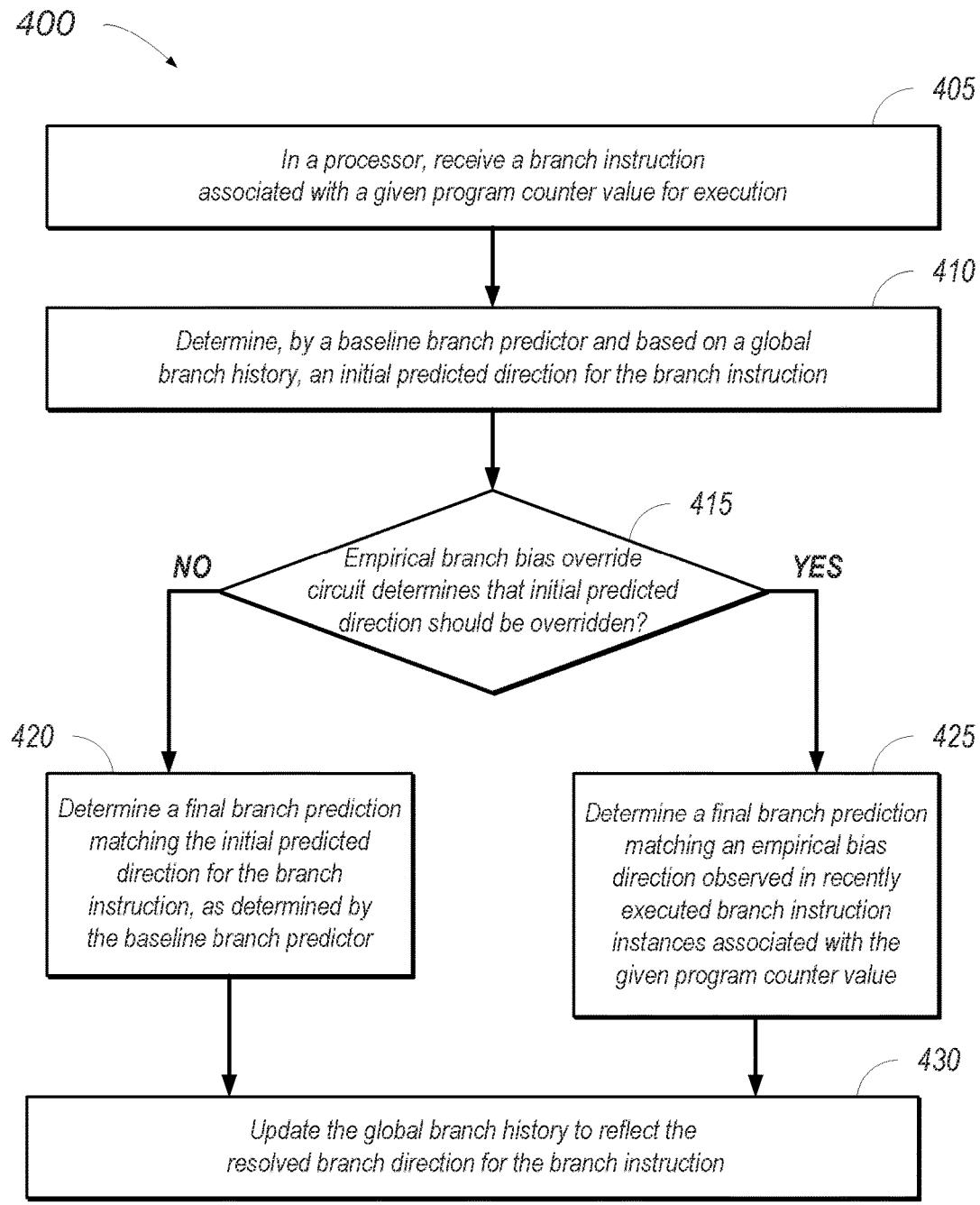
FIG. 4 is a flow diagram illustrating one embodiment of a method for performing branch prediction with empirical branch bias override.

FIG. 4 is a flow diagram illustrating a method 400 for performing branch prediction with empirical branch bias override, according to some embodiments of the present disclosure. Method 400 may be implemented by any of the elements shown in FIGS. 1-3C, or in FIGS. 7-14. In some embodiments, method 400 may be implemented by hardware circuitry, which may include any suitable combination of static (fixed-function) and/or programmable logic devices. In other embodiments, one or more of the operations of method 400 may be performed or emulated by the execution of program instructions. Method 400 may be initiated by any suitable criteria and may initiate operation at any suitable point. In one embodiment, method 400 may initiate operation at 405. Method 400 may include greater or fewer operations than those illustrated. Moreover, method 400 may execute its operations in an order different than those illustrated in FIG. 4. Method 400 may terminate at any suitable operation. Moreover, method 400 may repeat operation at any suitable operation. Method 400 may perform any of its operations in parallel with other operations of method 400, or in parallel with operations of other methods. Furthermore, method 400 may be executed multiple times to perform branch prediction with empirical branch bias override for different branch instruction instances. During the execution of method 400, other methods may be invoked, such as method 500 and/or method 600, described below. These additional methods may be invoked to perform at least some of the operations of method 400.

At 405, in one embodiment, a branch instruction associated with a given program counter value may be received, in a processor, for execution. At 410, an initial predicted direction for the branch instruction may be determined by a baseline branch predictor, based at least in part on a global branch history. If, at 415, an empirical branch bias override circuit determines that the initial predicted direction should be overridden, the method may include, at 425, determining a final branch prediction matching an empirical bias direction that was observed in recently retired branch instruction instances associated with the given program counter value. For example, the method may include determining a final branch prediction matching an empirical bias direction that was observed in most recent sliding execution window that includes a predetermined number of executed branch instruction instances associated with the given program counter value. If at 415, the empirical branch bias override circuit determines that initial predicted direction should not be overridden, the method may include, at 420, determining a final branch prediction matching the initial predicted direction for the branch instruction, as determined by the baseline branch predictor. In some embodiments, the final branch prediction may be output by the empirical branch bias override circuit and provided to another component of the processor or branch predictor. In some embodiments, the final branch prediction may be stored for subsequent access by another component of the processor or branch predictor. In some embodiments, regardless of whether or not the initial prediction was correct and regardless of whether or not the initial prediction was overridden, method 400 may include, at 430, updating the global branch history of the baseline branch predictor to reflect the resolved branch direction for the branch instruction following execution of the branch instruction and subsequent identification of the resolved branch direction (e.g., upon retirement of the branch instruction). Therefore, the resolved branch direction for the branch instruction may influence future initial predictions made by the baseline branch predictor regardless of whether or not the initial prediction was correct and regardless of whether or not the initial prediction was overridden.

In at least some embodiments of the present disclosure, an empirical branch bias override circuit within a branch predictor may determine an empirical bias direction for a given branch instruction that was observed in most recent sliding execution window that includes a predetermined number of retired instances of the given branch instruction. In at least some embodiments, the empirical branch bias override circuit may also capture an empirical bias fraction for the given branch instruction. In one example, if a sliding execution window includes resolved branch direction information for the 100 most recently retired instances of the given branch instruction and if, for 85 of the 100 most recently retired instances of the given branch instruction, the resolved branch direction was taken, the empirical bias fraction for the given branch instruction may be calculated as 85% (or 0.85), and the empirical bias direction for the given branch instruction is taken. In this example, if the predictor performance in that particular execution window is calculated to be much lower than 85%, the empirical branch bias override circuit may determine that, at least while the difference between the empirical bias fraction and the predictor performance for the given branch instruction exceeds a predetermined performance difference threshold, the initial predictions made by the baseline prediction for the given branch instruction should be overridden by the empirical bias direction when they do not match the empirical bias direction. For example, if the predictor performance is calculated as 30% (or 0.30), this may indicate that the baseline branch predictor is performing poorly with respect to the given branch instruction, and that it is not likely to be able to adjust its initial predictions quickly enough to reflect the branch direction bias that was observed in the most recent execution window. In this case, the large difference between the empirical bias fraction and the predictor performance for the given branch instruction presents an opportunity for prediction performance improvement that the empirical branch bias override circuit within the branch predictor may be able to exploit.

Figure 5:
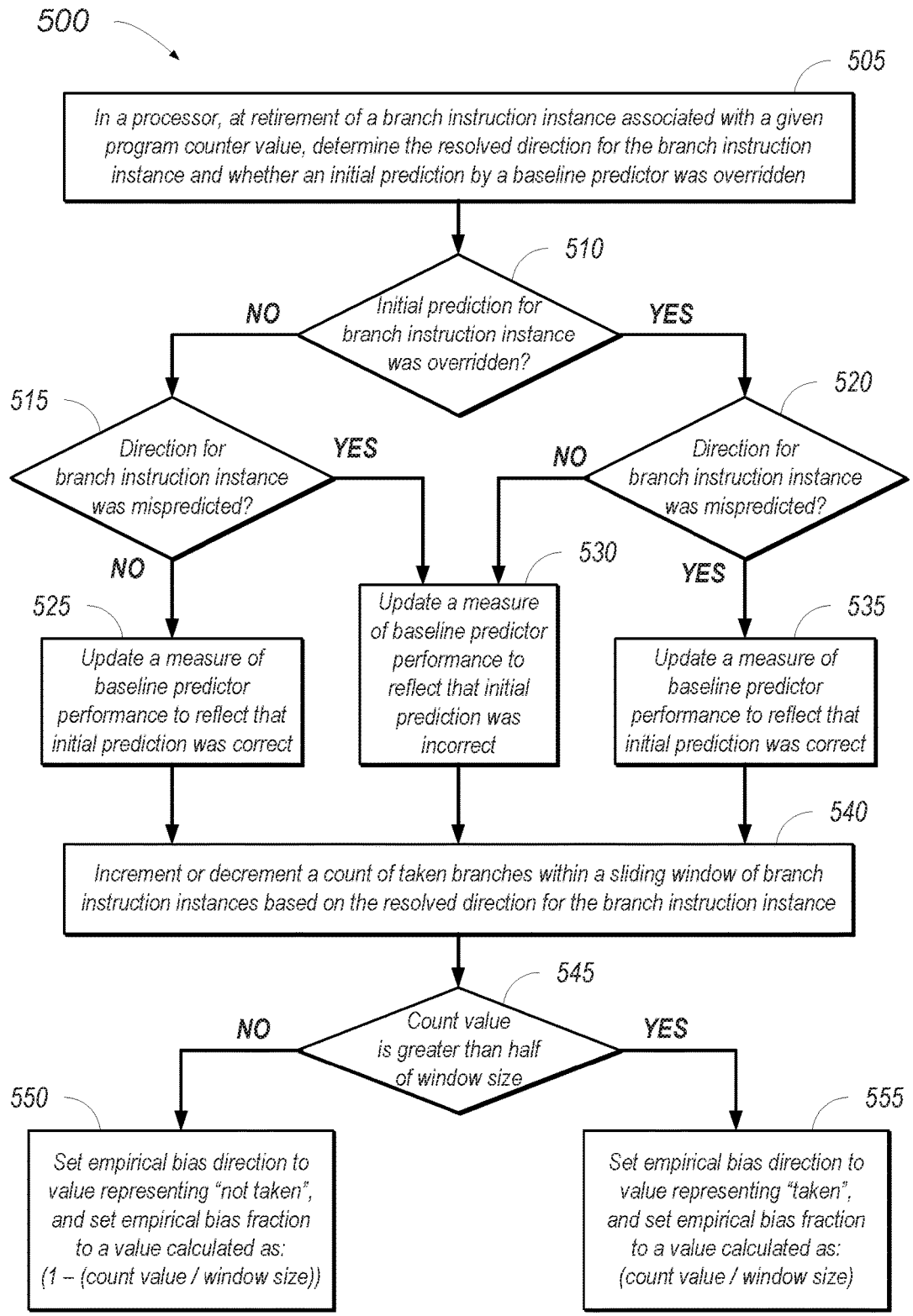
FIG. 5 is a flow diagram illustrating one embodiment of a method for updating a baseline branch predicator and a branch bias table upon retirement of a branch instruction.

FIG. 5 is a flow diagram illustrating a method 500 for updating a baseline branch predicator and a branch bias table upon retirement of a branch instruction, according to some embodiments of the present disclosure. Method 500 may be implemented by any of the elements shown in FIGS. 1-4, or in FIGS. 7-14. In some embodiments, method 500 may be implemented by hardware circuitry, which may include any suitable combination of static (fixed-function) and/or programmable logic devices. In other embodiments, one or more of the operations of method 500 may be performed or emulated by the execution of program instructions. Method 500 may be initiated by any suitable criteria and may initiate operation at any suitable point. In one embodiment, method 500 may initiate operation at 505. Method 500 may include greater or fewer operations than those illustrated. Moreover, method 500 may execute its operations in an order different than those illustrated in FIG. 5. Method 500 may terminate at any suitable operation. Moreover, method 500 may repeat operation at any suitable operation. Method 500 may perform any of its operations in parallel with other operations of method 500, or in parallel with operations of other methods. Furthermore, method 500 may be executed multiple times to perform updating a baseline branch predicator and a branch bias table upon retirement of different branch instructions. Method 500 may be invoked during the execution of method 400, described above. For example, method 500 may be invoked to perform at least some of the operations of method 400.

At 505, in one embodiment, method 500 may include, in a processor at retirement of a branch instruction instance associated with a given program counter value, determining the resolved direction for the branch instruction instance and determining whether or not an initial prediction by a baseline predictor was overridden. At 510, if it was determined that an initial prediction for the branch instruction instance was overridden, method 500 may continue at 520. Otherwise, method 500 may continue at 515. At 520, it may be determined whether or not the direction for the branch instruction was mispredicted. More specifically, it may be determined whether or not the final prediction, which in this case would have matched the empirical bias direction, resulted in a misprediction. If so, method 500 may continue at 535. Otherwise method 500 may continue at 530. At 535, a measure of the performance of the baseline predictor performance may be updated to reflect that the initial prediction was correct. In this case, the initial prediction was overridden and the use of the empirical bias direction for the final prediction resulted in a misprediction. At 530, a measure of the performance of the baseline predictor performance may be updated to reflect that the initial prediction was incorrect. In this case, the initial prediction was overridden, but the use of the empirical bias direction for the final prediction did not result in a misprediction.

At 515, it may be determined whether or not the direction for the branch instruction was mispredicted. More specifically, it may be determined whether or not the final prediction, which in this case would have matched the initial prediction, resulted in a misprediction. If so, method 500 may continue at 530. Otherwise method 500 may continue at 525. At 525, a measure of the performance of the baseline predictor performance may be updated to reflect that the initial prediction was correct. In this case, the initial prediction was not overridden, and the use of the initial prediction as the final prediction did not result in a misprediction. At 530, a measure of the performance of the baseline predictor performance may be updated to reflect that the initial prediction was incorrect. In this case, the initial prediction was not overridden, but the use of the initial prediction as the final prediction resulted in a misprediction.

Subsequent to any of the operations shown in 525, 530, or 535, method 500 may include, at 540, incrementing or decrementing a count of taken branches within a sliding window of branch instruction instances based on the resolved direction for the branch instruction instance. At 545, it may be determined whether or not the count value is greater than half of the window size. If so, method 500 may continue at 555. Otherwise, method 500 may continue at 550. At 555, the empirical bias direction for the branch instruction may be set to a value representing "taken", and the empirical bias fraction for the branch instruction may be set to a value calculated as: (count value/window size). At 550, the empirical bias direction for the branch instruction may be set to value representing "not taken", and the empirical bias fraction for the branch instruction may be set to a value calculated as: (1−(count value/window size)). In either 550 or 555, the determined values for the empirical bias direction and the empirical bias fraction for the branch instruction may be written to respective fields in an entry for the branch instruction in a branch bias table, such as branch bias table 310 illustrated in FIG. 3A.

In at least some embodiments of the present disclosure, an empirical branch bias override control circuit, such as empirical branch bias override control circuit 330 illustrated in FIG. 3A, may apply a predetermined or configurable branch bias override function to its inputs to determine whether or not to override an initial branch prediction made by a baseline branch predictor. In some embodiments, this branch bias override function may be applied to determine a final prediction for every branch instruction for which the baseline branch predictor generates an initial branch prediction. In some embodiments, applying the branch bias override function to an instance of a branch instruction associated with a given address identifier may include determining whether the number of instances of the branch instruction that have already been executed (occ) meets a minimum occurrence threshold value (min_occ). In such embodiments, until this minimum number of branch instruction instances have been executed, the branch bias information captured for the branch instruction may not be considered sufficient to justify its use in overriding an initial prediction made by the baseline branch predictor. Therefore, until this minimum number of branch instruction instances has been executed, the final prediction of the resolved direction for each instance of the branch instruction may match the initial predication made by the baseline branch predictor. In one example embodiment, the empirical branch bias override control circuit may include one or more comparators, such comparators 335 illustrated in FIG. 3A, to evaluate whether or not the expression (((EBF−PP)>PPDT) && (occ>min_occ)) is true.

In some embodiments, the minimum occurrence threshold value may be fixed for a given branch bias override function. In other embodiments, the minimum occurrence threshold value may be set to an initial or default value and may be modified at runtime in an attempt to improve the overall prediction performance of the branch predictor. For example, the minimum occurrence threshold value may be modified until a minimum occurrence threshold value that results in good overall prediction performance for the current workload is identified. In one embodiment, the minimum occurrence threshold value may be on the order of 10. In another embodiment, the minimum occurrence threshold value may be on the order of 100 or greater.

In some embodiments, if the number of instances of a branch instruction that have already been executed meets a minimum occurrence threshold value, the empirical branch bias override control circuit may obtain the empirical bias fraction and the predictor performance value for the branch instruction from a branch bias table maintained by, or on behalf of, the empirical branch bias override control circuit. For example, the empirical branch bias override control circuit may read these values from an entry in the branch bias table that is indexed by the address identifier associated with the branch instruction. The empirical branch bias override control circuit may calculate the difference between the empirical bias fraction and the predictor performance value, and may compare that difference to a predetermined performance difference threshold value. If the difference between the empirical bias fraction and the predictor performance value exceeds the predetermined performance difference threshold value, the empirical branch bias override control circuit may output a signal indicating that an initial prediction of the resolved branch direction for an instance of the branch instruction should be overridden, and that the final prediction of the resolved direction for the instance of the branch instruction should match an empirical bias direction indicated by data in thread from the entry in the branch bias table that is associated with the branch instruction. If the difference between the empirical bias fraction and the predictor performance value does not exceed the predetermined performance difference threshold value, the empirical branch bias override control circuit may output a signal indicating that an initial prediction of the resolved branch direction for an instance of the branch instruction should not be overridden. In this case, the final prediction of the resolved direction for the instance of the branch instruction should match the initial prediction of the resolved branch direction for an instance of the branch instruction.

In some embodiments, if the empirical branch bias override control circuit outputs a signal indicating that an initial prediction of the resolved branch direction for an instance of the branch instruction should not be overridden, an empirical branch override indicator, which may be referred to as an EBO bit, may be set to a value indicating that the initial prediction was not overridden, regardless of whether the empirical bias direction for the branch instruction is different from the initial prediction or is the same as the initial prediction. In some embodiments, if the empirical branch bias override control circuit outputs a signal indicating that an initial prediction of the resolved branch direction for an instance of the branch instruction should be overridden, and if the empirical bias direction for the branch instruction is different from the initial prediction, the empirical branch override indicator (or EBO bit) may be set to a value indicating that the initial prediction was, in fact, overridden. However, if the empirical branch bias override control circuit outputs a signal indicating that an initial prediction of the resolved branch direction for an instance of the branch instruction should be overridden, but the empirical bias direction for the branch instruction is the same as the initial prediction, the empirical branch override indicator (or EBO bit) may be set to a value indicating that the initial prediction was not actually overridden.

An example branch bias table is illustrated below, according to some embodiments. As illustrated in Table 1, each entry in the branch bias table may be associated with a respective address identifier (e.g., an instruction pointer value or program counter value). Each entry includes an empirical bias fraction value, an empirical bias direction value, and a predictor performance value for the baseline branch predictor.

TABLE 1

Example Branch Bias Table

| Empirical Bias Fraction | Empirical Bias Direction | Baseline Predictor Performance |
|---|---|---|
| 0.75 | 1 (taken) | 0.40 |
| 0.63 | 0 (not taken) | 0.45 |
| 0.52 | 0 (not taken) | 0.35 |
| . . . | . . . | . . . |

In this example, a first entry, which stores branch bias information for branch instruction instances associated with a first address identifier (e.g., a first instruction pointer value or program counter value), includes an empirical bias fraction value of 0.75, an empirical bias direction value of 1 (indicating a bias toward taken), and a predictor performance value for the baseline branch predictor of 0.40. When another instance of the branch instruction associated with the first address identifier is received, an empirical branch bias override control circuit may calculate the difference between the empirical bias fraction and the predictor performance value for the baseline branch predictor as 0.75−0.4=0.3. In this example, if the performance difference threshold is less than 0.3 (e.g., if the performance difference threshold is 0.2), and if the minimum occurrence threshold value has been met for the branch instruction, the empirical branch bias override control circuit may output a signal indicating that the initial prediction generated by the baseline branch predictor for this branch instruction instance may be overridden. In this case, the final prediction may be set to the empirical bias direction as taken. If the initial prediction was not taken, the EBO bit for this branch instruction may be set. Otherwise, the EBO bit may not be set.

In the example branch bias table above, a second entry, which stores branch bias information for branch instruction instances associated with a second address identifier (e.g., a second instruction pointer value or program counter value), includes an empirical bias fraction value of 0.63, an empirical bias direction value of 0 (indicating a bias toward not taken), and a predictor performance value for the baseline branch predictor of 0.45. When another instance of the branch instruction associated with the second address identifier is received, an empirical branch bias override control circuit may calculate the difference between the empirical bias fraction and the predictor performance value for the baseline branch predictor as 0.63−0.45=0.18. In this example, if the performance difference threshold is 0.2, the empirical branch bias override control circuit may output a signal indicating that the initial prediction generated by the baseline branch predictor for this branch instruction instance should not be overridden. In this case, the final prediction may be set to the direction indicated in the initial prediction made by the baseline branch predictor, and the EBO bit for this branch instruction may not be set.

Figure 6:
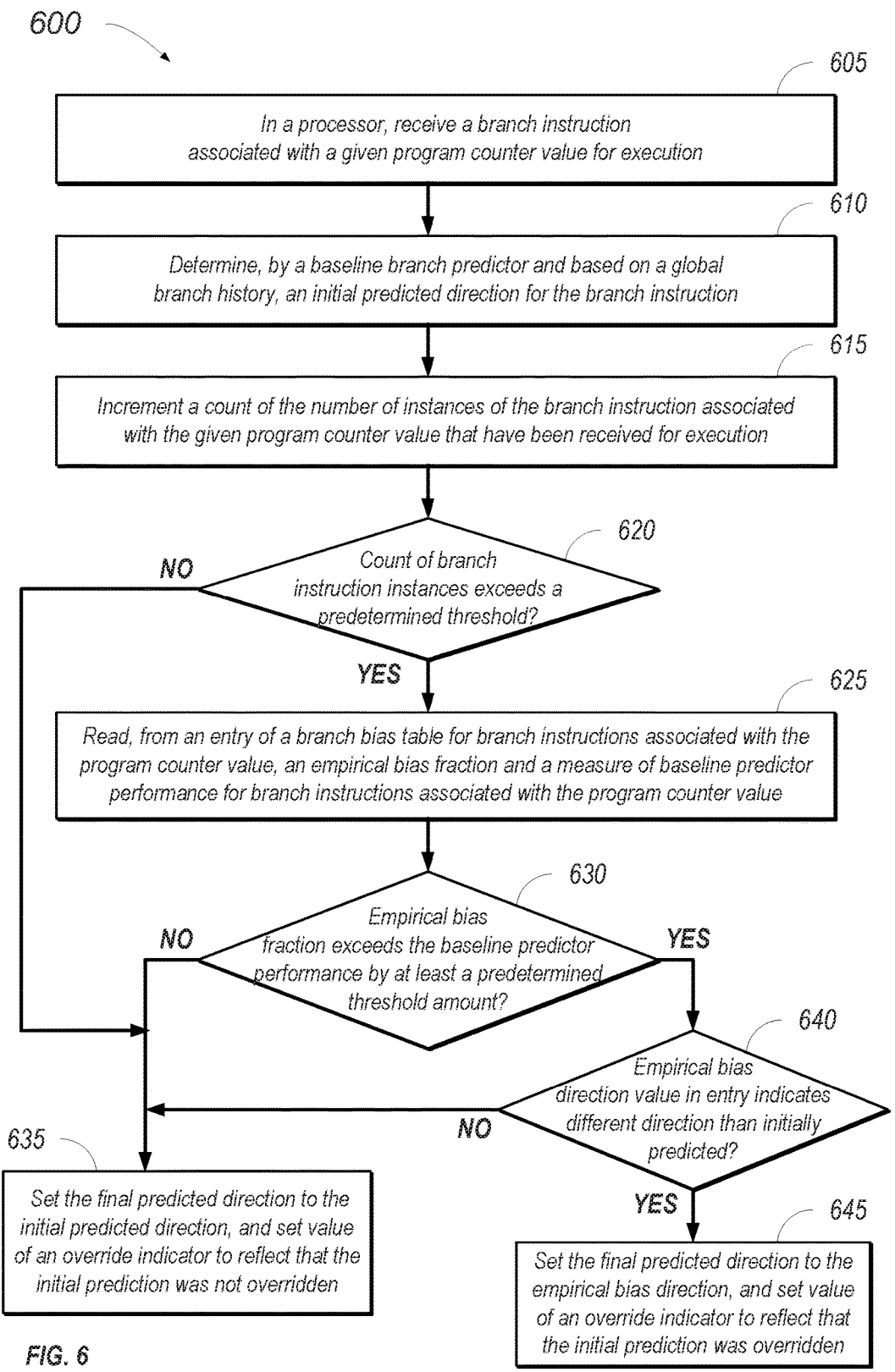
FIG. 6 is a flow diagram illustrating one embodiment of a method for determining whether to override a baseline branch predication based on an empirical bias.

FIG. 6 is a flow diagram illustrating a method 600 for determining whether to override a baseline branch predication based on an empirical bias, according to some embodiments of the present disclosure. Method 600 may be implemented by any of the elements shown in FIGS. 1-6, or in FIGS. 7-14. In some embodiments, method 600 may be implemented by hardware circuitry, which may include any suitable combination of static (fixed-function) and/or programmable logic devices. In other embodiments, one or more of the operations of method 600 may be performed or emulated by the execution of program instructions. Method 600 may be initiated by any suitable criteria and may initiate operation at any suitable point. In one embodiment, method 600 may initiate operation at 605. Method 600 may include greater or fewer operations than those illustrated. Moreover, method 600 may execute its operations in an order different than those illustrated in FIG. 6. Method 600 may terminate at any suitable operation. Moreover, method 600 may repeat operation at any suitable operation. Method 600 may perform any of its operations in parallel with other operations of method 600, or in parallel with operations of other methods. Furthermore, method 600 may be executed multiple times to determine whether to override baseline branch predications for different branch instructions based on an empirical bias. Method 600 may be invoked during the execution of method 400, described above. For example, method 600 may be invoked to perform at least some of the operations of method 400.

At 605, in one embodiment, a branch instruction associated with a given program counter value may be received, in a processor, for execution. At 610, an initial predicted direction be determined for the branch instruction by a baseline branch predictor, based at least in part on a global branch history. At 615, a count of the number of instances of the branch instruction associated with the given program counter value that have been received for execution may be incremented. At 620, it may be determined whether or not the count of branch instruction instances exceeds a predetermined minimum occurrence threshold. If so, method 600 may continue at 625. Otherwise, method 600 may continue at 635. At 625, method 600 may include reading, from an entry of a branch bias table for branch instructions associated with the program counter value, an empirical bias fraction and a measure of baseline predictor performance for branch instructions associated with the program counter value At 630, it may be determined whether or not the value read from the empirical bias fraction field in the branch bias table entry for the branch instructions exceeds the value read from the baseline predictor performance field in the branch bias table entry by at least a predetermined performance difference threshold amount. If so, method 600 may continue at 640. Otherwise, method 600 may continue at 635. At 640, it may be determined whether or not the value read from the empirical bias direction field in the branch bias table entry for the branch instructions indicates a direction that is different than the initially predicted direction. If so, method 600 may continue at 645. Otherwise, method 600 may continue at 635. At 645, the final predicted direction may be set to the empirical bias direction, and the value of an override indicator may be set to a value indicating that the initial prediction was overridden. At 635, the final predicted direction may be set to the initial predicted direction, and the value of an override indicator may be set to a value indicating that the initial prediction was not overridden.

The mechanisms described herein for performing branch prediction with empirical branch bias override were evaluated using a cycle-accurate simulator configured for studying the performance of various processor cores. More specifically, the impact of these mechanisms was evaluated using more than 200 traces that were observed to have high branch prediction activity and higher than average occurrence of branch instruction instances and/or mispredictions due to incorrect branch predictions. These traces experience more sensitivity to changes in the quality of branch predictions than other types of workloads. Overall, in the best case, these traces showed an increase in IPC of about 0.32% over a simulation of the same traces on a processor that includes a baseline branch predictor without empirical branch bias override, with 51 traces showing an improvement of more than 0.5% and 14 traces showing an improvement of more than 1%. For one category of traces, the IPC gain was about 1.4%, when compared to a baseline branch predictor with a statistical correlator. Across a wider collection of more than 750 traces, IPC gains of about 0.18% over the baseline processor were observed. Reductions in MPKI of more than 1% were also observed.

An evaluation of the applicability of branch prediction with empirical branch bias override was also performed. In this evaluation, it would observed that, the percentage of windows across different workload categories in which there was at least a 10% difference between the empirical bias fraction (EBF) and the predictor performance of the baseline branch predictor (PP) was about 8%. In other words, in about 8% of the execution windows there existed an opportunity to apply branch prediction with empirical branch bias override.

The threshold values applied by the empirical branch bias override circuits and functions described herein may be fixed or may be configurable during runtime, in different embodiments. In some embodiments, they may be tuned for a particular workload. For example, during an evaluation of the techniques described herein, performance difference threshold values of 10%, and 25% were simulated. A variety of different window sizes may also be applied, in different embodiments. For example, in different embodiments, a sliding execution window may include the 5, 10, or 100 most recently retired instances of a given branch instruction. The minimum occurrence threshold value may be fixed or configurable, in different embodiments.

A simple targeted microbenchmark, which includes branches that, within specific windows, are biased in particular directions (e.g., toward taken or toward not taken) can be used to capture the performance impact of the techniques described herein for performing branch prediction with empirical branch bias override. One example of such a microbenchmark is illustrated by the pseudocode below:

```
1     For a=1..100
2     {
3         c=a%2;
4         d = userinput( );
5
6         if(d>100)
7             do something
8         e= userinput ()
9         if(e>100)
10            do something
11
12        For b=1..10
13        {
14            if(c==1)
15                do then
16            else
17                do else
18        }
19    }
```

In this example, for the conditional branch shown on line 14, the pattern of resolved branch directions that will be observed at runtime includes a string of 10 occurrences of "not taken", followed by 50 occurrences of "taken", and so on. In this example, a branch predictor with empirical branch bias override may quickly detect the local branch biasing within these windows. Therefore, once the predictor performance of a baseline branch predictor drops to a point at which the difference between the predictor performance and the empirical bias fraction exceeds a performance difference threshold, the empirical branch bias circuitry may override the initial predictions made by the baseline branch predictor, setting the final prediction to the empirical bias direction.

As processor core pipelines become wider and deeper, more effective branch prediction may be employed to reduce mispredictions and avoid corresponding performance stalls. The mechanisms described herein may identify biasing in the resolved branch direction, at runtime, for instances of a given branch instruction and may use that information to lower the overall branch misprediction rate of a processor core, as compared to a processor that includes a baseline branch predictor without empirical branch bias override. This may, consequently, improve the overall performance of the processor core and the quality of products that include the processor core.

The techniques described herein may provide the largest increases in performance when the processor core is presented with workloads in which the observed branch direction bias for a given branch instruction repeatedly switches back and forth between taken and not taken. With these types of workloads, existing global-history-based branch predictors may not be able to detect the windows during which the branch direction is biased toward one direction before the branch direction becomes biased toward the other direction.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a CPU, including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 7A:
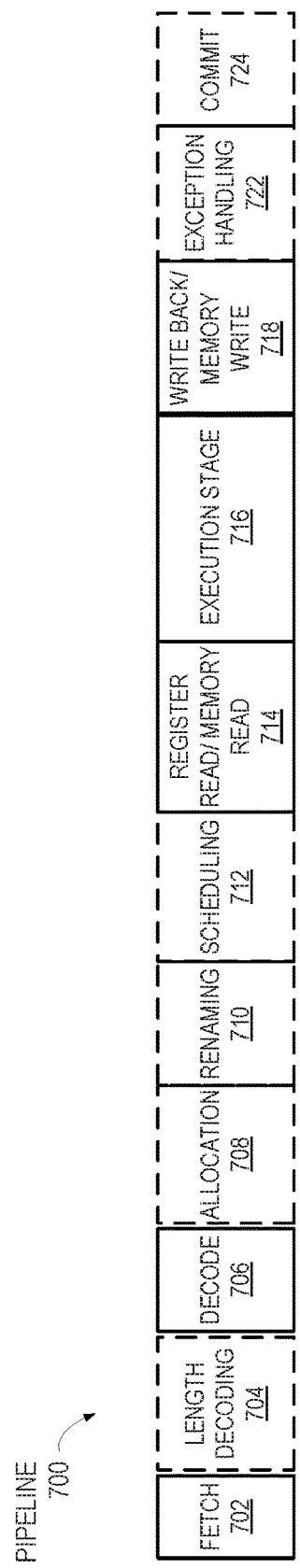
FIG. 7A is a block diagram illustrating an in-order pipeline and a register renaming, out-of-order issue/execution pipeline, according to some embodiments of the present disclosure.
Figure 7B:
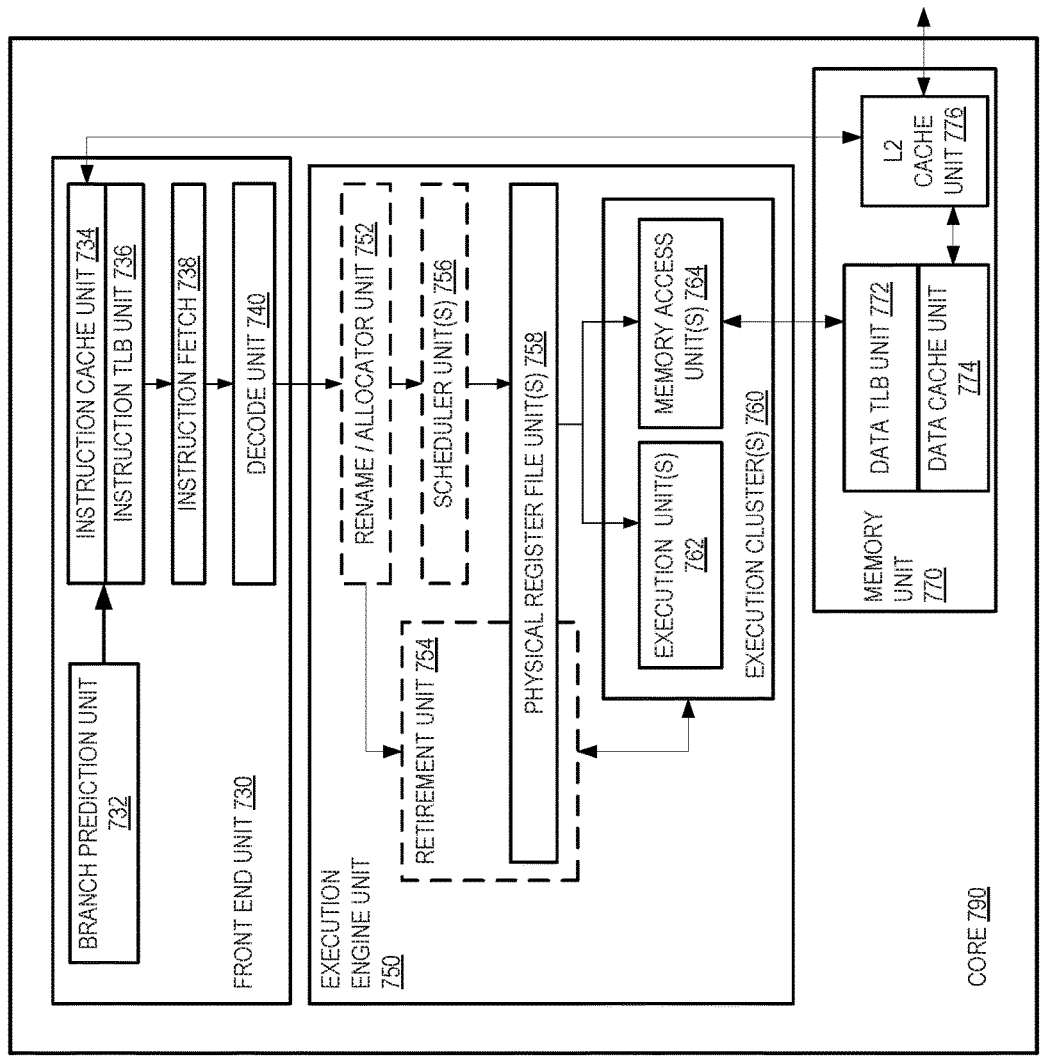
FIG. 7B is a block diagram illustrating an in-order architecture core and register renaming, out-of-order issue/execution logic to be included in a processor, according to some embodiments of the present disclosure.

FIG. 7A is a block diagram illustrating an example in-order pipeline and a register renaming, out-of-order issue/execution pipeline, according to some embodiments. FIG. 7B is a block diagram illustrating an in-order architecture core and register renaming, out-of-order issue/execution logic to be included in a processor, according to some embodiments. The solid lined boxes in FIG. 7A illustrate the in-order pipeline, while the dashed lined boxes illustrate the register renaming, out-of-order issue/execution pipeline. Similarly, the solid lined boxes in FIG. 7B illustrate the in-order architecture logic, while the dashed lined boxes illustrate the register renaming logic and out-of-order issue/execution logic In FIG. 7A, a processor pipeline 700 includes a fetch stage 702, a length decoding stage 704, a decode stage 706, an allocation stage 708, a renaming stage 710, a scheduling stage 712 (also known as a dispatch or issue stage), a register read/memory read stage 714, an execution stage 716, a write back/memory write stage 718, an exception handling stage 722, and a commit stage 724.

In FIG. 7B, arrows denote a coupling between two or more units and the direction of the arrow indicates a direction of data flow between those units. In this example, FIG. 7B illustrates a processor core 790 including a front end unit 730 coupled to an execution engine unit 750, both of which may be coupled to a memory unit 770. The core 790 may be a reduced instruction set computing (RISC) core, a complex instruction set computing (CISC) core, a very long instruction word (VLIW) core, or a core of a hybrid or alternative core type, in different embodiments. In various embodiments, core 790 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 730 includes a branch prediction unit 732 coupled to an instruction cache unit 734. Instruction cache unit 734 may be coupled to an instruction translation lookaside buffer (TLB) 736. TLB 736 may be coupled to an instruction fetch unit 738, which may be coupled to a decode unit 740. Decode unit 740 may decode instructions, and may generate as an output one or more micro-operations, micro-code entry points, microinstructions, other instructions, or other control signals, which are decoded from, or which otherwise reflect, or are derived from, the original undecoded instructions. Decode unit 740 may be implemented using any of a variety of suitable mechanisms, in different embodiments. Examples of suitable mechanisms may include, but are not limited to, look-up tables, hardware circuitry, programmable logic arrays (PLAs), microcode read only memories (ROMs). In one embodiment, instruction cache unit 734 may be further coupled to a level 2 (L2) cache unit 776 in memory unit 770. In one embodiment, the core 790 may include a microcode ROM or other medium that stores microcode for certain macroinstructions (e.g., within decode unit 740 or elsewhere within the front end unit 730). The decode unit 740 may be coupled to a rename/allocator unit 752 within the execution engine unit 750.

In this example, execution engine unit 750 includes the rename/allocator unit 752, which may be coupled to a retirement unit 754 and a set of one or more scheduler unit(s) 756. Scheduler unit(s) 756 may represent any number of different schedulers of various types, including those that implement reservations stations or those that implement a central instruction window. As illustrated in this example, scheduler unit(s) 756 may be coupled to physical register file unit(s) 758. Each of the physical register file units 758 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 758 may include a vector register unit, a write mask register unit, and a scalar register unit (not shown). These register units may provide architectural vector registers, write mask registers (e.g., vector mask registers), and general-purpose registers.

In FIG. 7B, the physical register file unit(s) 758 are shown as being overlapped by the retirement unit 754 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from the outside of the processor and/or from a programmer's perspective. The registers are not limited to any particular known type of circuit. Rather, any of a variety of different types of registers may be suitable for inclusion in core 790 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 7B, retirement unit 754 and physical register file unit(s) 758 are coupled to the execution cluster(s) 760. Each of execution clusters 760 may include a set of one or more execution units 762 and a set of one or more memory access units 764. Execution units 762 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units all of which perform all supported functions or operations. In the example illustrated in FIG. 7B, scheduler unit(s) 756, physical register file unit(s) 758, and execution cluster(s) 760 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 764. It should also be understood that where separate pipelines are used, one or more of these pipelines may be out-of-order issue/execution pipelines and the rest may be in-order execution pipelines.

In the example illustrated in FIG. 7B, the set of memory access units 764 may be coupled to the memory unit 770, which includes a data TLB unit 772. Data TLB unit 772 may be coupled to a data cache unit 774, which in turn may be coupled to a level 2 (L2) cache unit 776. In one example embodiment, the memory access units 764 may include a load unit, a store address unit, and a store data unit, each of which may be coupled to the data TLB unit 772 in the memory unit 770. The L2 cache unit 776 may be coupled to one or more other levels of cache and, eventually, to a main memory. While FIG. 7B illustrates an embodiment in which instruction cache unit 734, data cache unit 774, and level 2 (L2) cache unit 776 reside within core 790, in other embodiments one or more caches or cache units may be internal to a core, external to a core, or apportioned internal to and external to a core in different combinations.

In one example embodiment, the register renaming, out-of-order issue/execution core architecture illustrated in FIG. 7B may implement pipeline 700 illustrated in FIG. 7B as follows. The instruction fetch unit 738 may perform the functions of the fetch and length decoding stages 702 and 704. The decode unit 740 may perform the functions of decode stage 706. The rename/allocator unit 752 may perform the functions of the allocation stage 708 and the renaming stage 710. The scheduler unit(s) 756 may perform the functions of the scheduling stage 712. The physical register file unit(s) 758 and the memory unit 770 may, collectively, perform the functions of the register read/memory read stage 714. The execution cluster(s) 760 may perform the functions of the execution stage 716. The memory unit 770 and the physical register file unit(s) 758 may, collectively, perform the functions of the write back/memory write stage 718. In different embodiments, various units (some of which may not be shown) may be involved in performing the functions of the exception handling stage 722. The retirement unit 754 and the physical register file unit(s) 758 may, collectively, perform the functions of the commit stage 724. In different embodiments, core 790 may support one or more instructions sets, including the instruction(s) described herein. For example, in various embodiments, core 790 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 790 may include logic to support a packed data instruction set extension (e.g., AVX1 or AVX2), thereby allowing the operations used by many multimedia applications to be performed using packed data.

In some embodiments, core 790 may support multithreading (e.g., executing two or more parallel sets of operations or threads), and may do so in a variety of ways. Core 790 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 790 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 7B, core 790 includes separate instruction and data cache units 734 and 774, respectively, and a shared L2 cache unit 776, in other embodiments core 790 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example in-Order Core Architecture

Figure 8B:
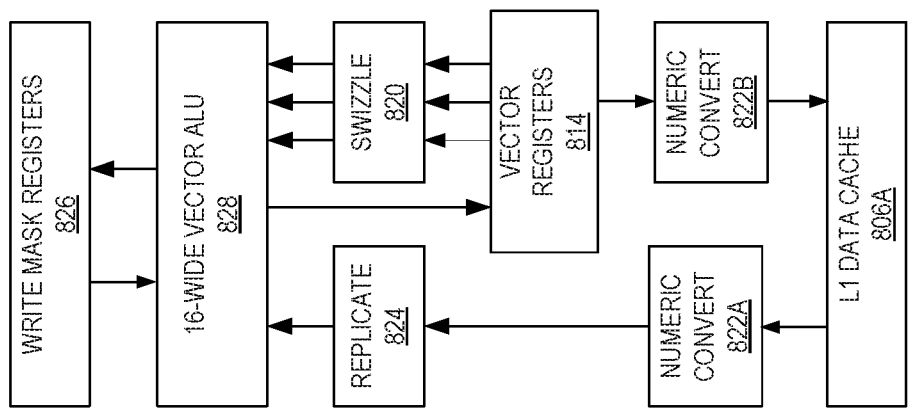
FIGS. 8A and 8B are block diagrams illustrating an example in-order core architecture, according to some embodiments of the present disclosure.
Figure 8A:
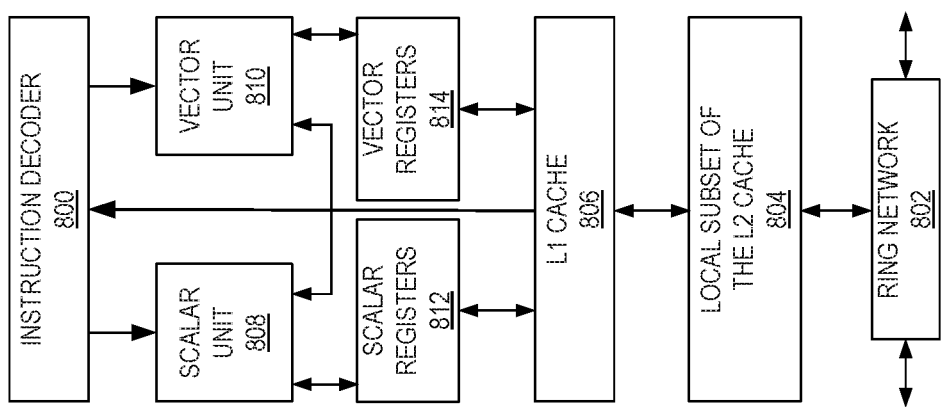

FIGS. 8A and 8B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 8A is a block diagram illustrating a single processor core, along with its connections to an on-die interconnect network (shown as ring network 802) and to its local subset of a Level 2 (L2) cache 804, according to some embodiments. In one embodiment, an instruction decoder 800 may support the x86 instruction set with a packed data instruction set extension. An L1 cache 806 may allow low-latency accesses to cache memory by the scalar and vector units. In one embodiment (e.g., to simplify the design), a scalar unit 808 and a vector unit 810 may use separate register sets (e.g., scalar registers 812 and vector registers 814, respectively)

and data that is transferred between them may be written to memory and then read back in from level 1 (L1) cache 806. However, other embodiments may use a different approach. For example, they may include a single register set or may include a communication path that allows data to be transferred between the two register files without being written to memory and read back.

In this example, the local subset of the L2 cache 804 may be part of a global L2 cache that is divided into separate local subsets, e.g., with one subset per processor core. Each processor core may have a direct access path to its own local subset of the L2 cache 804. Data read by a processor core may be stored in its L2 cache subset 804 from which it can be accessed quickly and in parallel with accesses by other processor cores to their own local L2 cache subsets. Data written by a processor core and stored in its own L2 cache subset 804 may be flushed from other L2 cache subsets, if necessary. In some embodiments, the ring network 802 may ensure coherency for shared data. The ring network may be bi-directional to allow agents such as processor cores, L2 caches and other logic blocks to communicate with each other within the chip. In one embodiment, each ring datapath may be 1012 bits wide per direction. FIG. 8B illustrates an expanded view of part of the processor core illustrated in FIG. 8A, according to some embodiments. In this example, FIG. 8B includes an L1 data cache 806A, which may be part of the L1 cache 804, as well as more detail regarding the vector unit 810 and the vector registers 814. Specifically, the vector unit 810 may be a 16-wide vector processing unit (VPU) that includes a 16-wide vector ALU 828. ALU 828 may be configured to execute one or more of integer, single-precision float, and double-precision float instructions. The VPU may also support swizzling the register inputs (using swizzle unit 820), numeric conversion (using numeric convert units 822A and 822B), and replication (using replication unit 824) on the memory input. The inclusion of write mask registers 826 may allow for predicating resulting vector writes.

Figure 9:
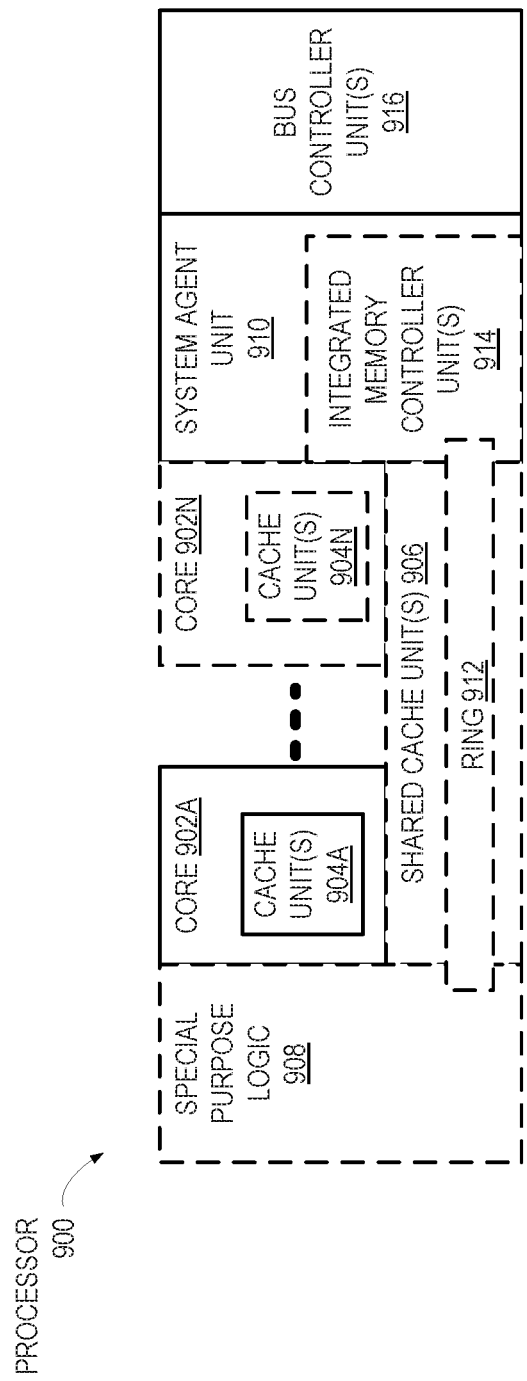
FIG. 9 is a block diagram illustrating a processor, according to some embodiments of the present disclosure.

FIG. 9 is a block diagram illustrating a processor 900 that may, in some embodiments, include more than one core, an integrated memory controller, and/or may special purpose logic (such as for integrated graphics computing). The solid lined boxes in FIG. 9 illustrate a processor 900 that includes a single core 902A, a system agent 910, and a set of one or more bus controller units 916. With the optional addition of the dashed lined boxes, an alternative embodiment of processor 900 includes multiple cores 902A-902N, and also includes a set of one or more integrated memory controller unit(s) 914 within the system agent unit 910, and special purpose logic 908. In some embodiments, one or more of cores 902A-902N may be similar to processor core 790 illustrated in FIG. 7B or the processor core illustrated in FIGS. 8A and 8B.

In some embodiments, processor 900 may represent a CPU in which the special purpose logic 908 includes integrated graphics and/or scientific logic (which may include one or more cores), and in which the cores 902A-902N include one or more general purpose cores (e.g., general purpose in-order cores, general purpose out-of-order cores, or a combination of the two). In other embodiments, processor 900 may represent a coprocessor in which the cores 902A-902N include a large number of special purpose cores intended primarily for graphics and/or scientific computing (e.g., high throughput computing). In still other embodiments, processor 900 may represent a coprocessor in which the cores 902A-902N include a large number of general purpose in-order cores. Thus, in different embodiments, the processor 900 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 900 may be implemented on one chip or on more than one chip, in different embodiments. The processor 900 may be a part of and/or may be implemented on one or more substrates using any of a number of process technologies, such as, for example, BiCMOS, CMOS, or NMOS.

In the example illustrated in FIG. 9, the memory hierarchy includes one or more levels of cache within each of the cores 902A-902N, shown as cache units 904A-904N, a set of one or more shared cache units 906, and external memory (not shown), some or all of which are coupled to the set of integrated memory controller units 914. The set of shared cache units 906 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 912 may be used to interconnect the special purpose logic 908 (which may include integrated graphics logic), the set of shared cache units 906, and the system agent unit 910/integrated memory controller unit(s) 914. In other embodiments, any number of other suitable techniques may be used for interconnecting such units. In one embodiment, coherency may be maintained between one or more cache units 906 and cores 902A-902N.

In some embodiments, one or more of the cores 902A-902N may be capable of multithreading. In some embodiments, the system agent 910 may include circuitry or logic for coordinating and operating cores 902A-902N. For example, the system agent unit 910 may include a power control unit (PCU) and a display unit. The PCU may be or include logic and circuitry for regulating the power state of the cores 902A-902N and the special purpose logic 908 (which may include integrated graphics logic). The display unit may include circuitry or logic for driving one or more externally connected displays.

In various embodiments, the cores 902A-902N may be homogenous or heterogeneous in terms of architecture instruction set. That is, two or more of the cores 902A-902N may be capable of executing the same instruction set, while others may be capable of executing only a subset of that instruction set or may execute a different instruction set.

Example Computer Architectures

Figure 10:
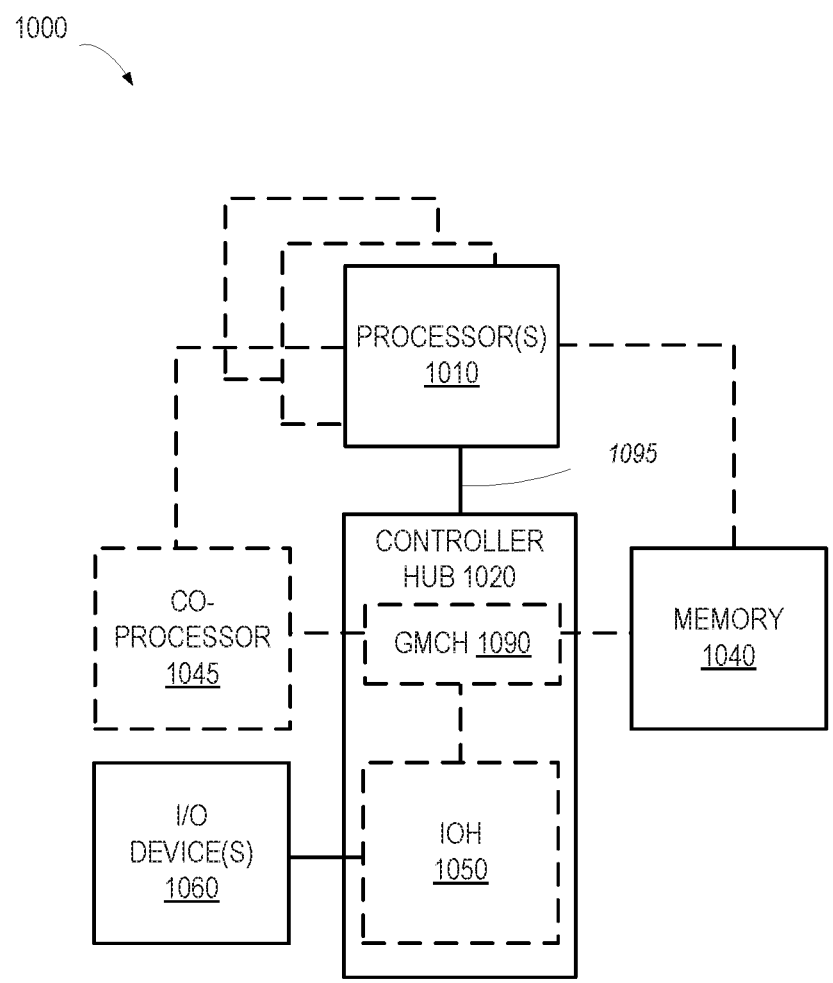
FIGS. 10 through 13 are block diagrams illustrating example computer architectures, according to some embodiments of the present disclosure.
Figure 11:
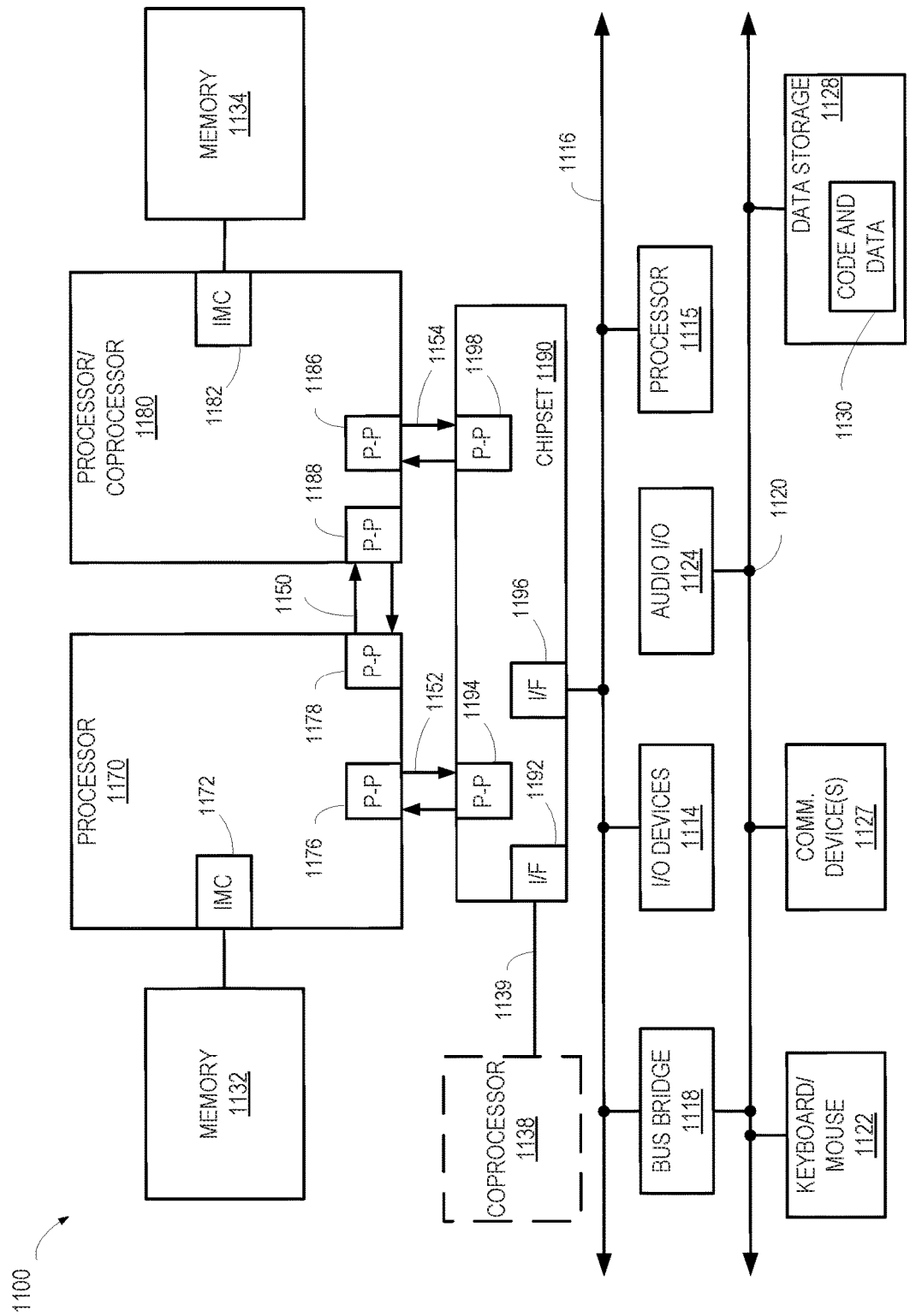
Figure 12:
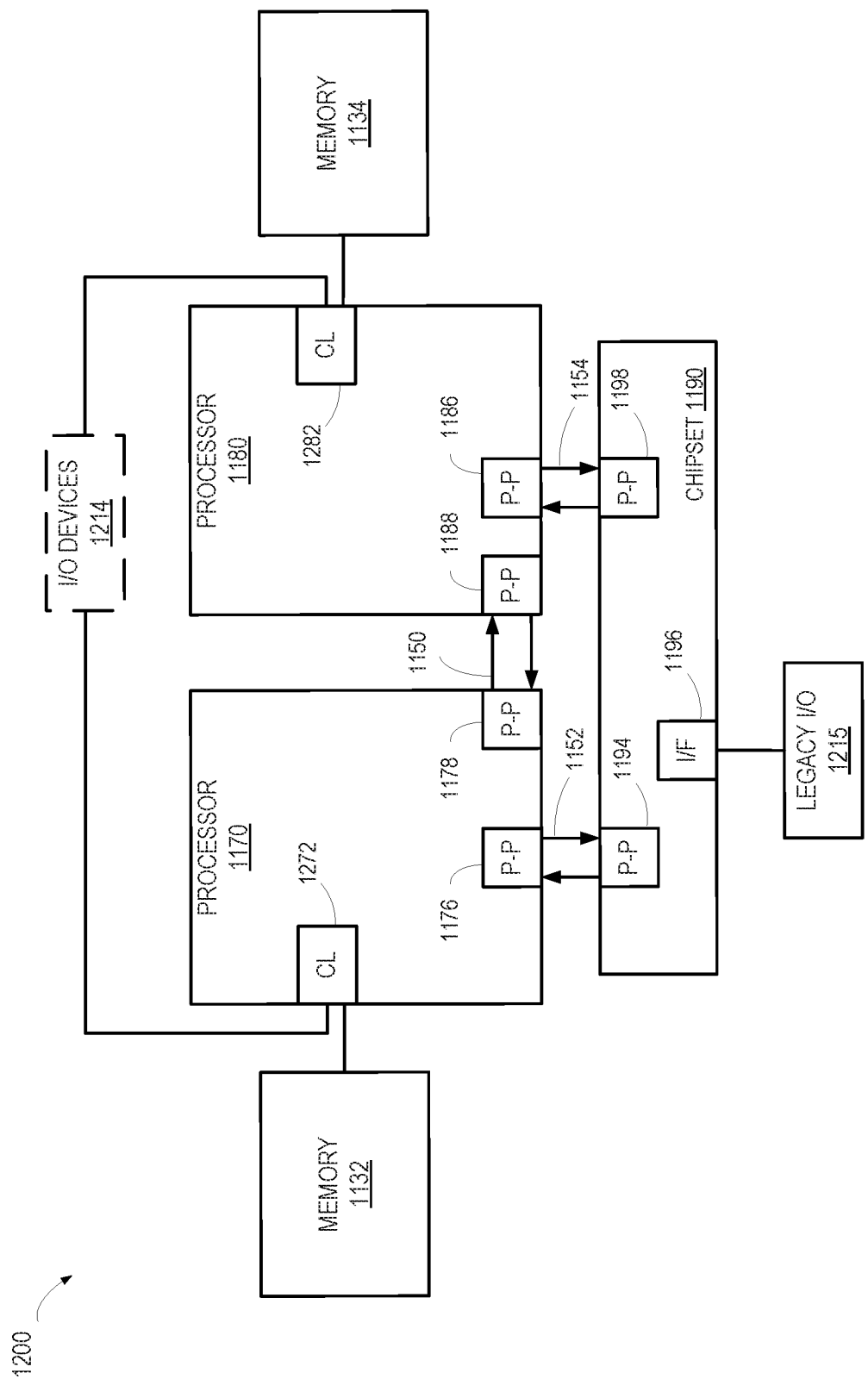
Figure 13:
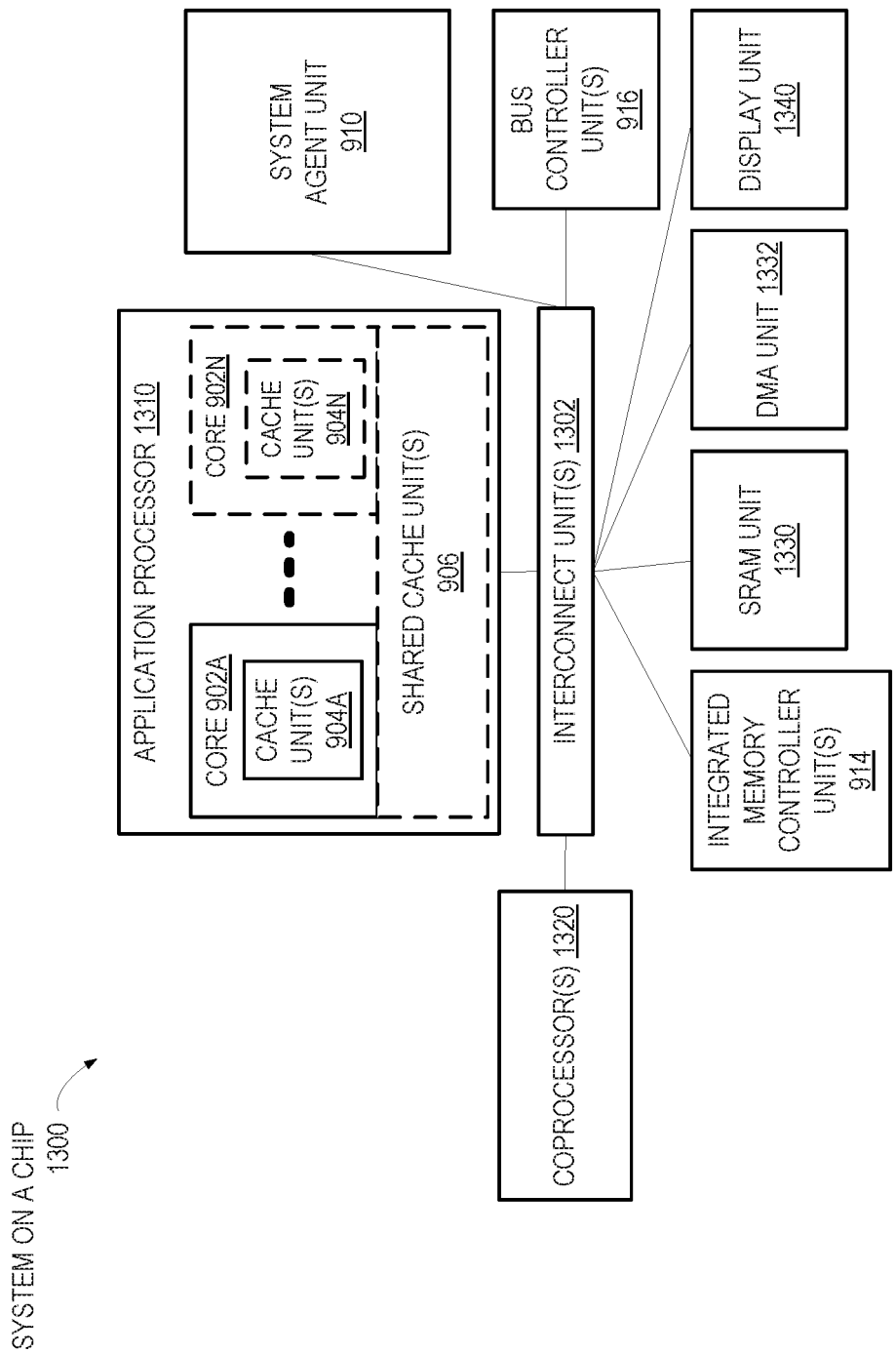

FIGS. 10 through 12 are block diagrams illustrating example systems suitable for the inclusion of one or more processors including, but not limited to, the processors described herein. FIG. 13 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 10 is a block diagram illustrating a system 1000, in accordance with one embodiment of the present disclosure. As illustrated in this example, system 1000 may include one or more processors 1010, which are coupled to a controller hub 1020. In some embodiments, controller hub 1020 may include a graphics memory controller hub (GMCH) 1090 and an Input/Output Hub (IOH) 1050. In some embodiments, GMCH 1090 and IOH 1050 may be on separate chips. In this example, GMCH 1090 may include memory and graphics controllers (not shown) to which are coupled memory 1040 and a coprocessor 1045, respectively. In this example, IOH 1050 couples one or more input/output (I/O) devices 1060 to GMCH 1090. In various embodiments, one or both of the memory and graphics controllers may be integrated within the processor (as described herein), the memory 1040 and/or the coprocessor 1045 may be coupled directly to the processor(s) 1010, or the controller hub 1020 may be implemented in a single chip that includes the IOH 1050.

The optional nature of additional processors 1010 is denoted in FIG. 10 with broken lines. Each processor 1010 may include one or more of the processing cores described herein and may be implemented by a version of the processor 900 illustrated in FIG. 9 and described herein.

In various embodiments, the memory 1040 may, for example, be dynamic random access memory (DRAM), phase change memory (PCM), or a combination of the two. In at least some embodiments, the controller hub 1020 may communicate with the processor(s) 1010 via a multi-drop bus such as a frontside bus (FSB), a point-to-point interface such as QuickPath Interconnect (QPI), or a similar connection, any one of which may be represented in FIG. 10 as interface 1095.

In one embodiment, the coprocessor 1045 may be a special purpose processor, such as, for example, a high-throughput MIC processor, a network or communication processor, a compression engine, a graphics processor, a GPGPU, an embedded processor, or another type of coprocessor. In one embodiment, controller hub 1020 may include an integrated graphics accelerator (not shown).

In some embodiments, there may be a variety of differences between the physical resources of different ones of the processors 1010. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1010 may execute instructions that control data processing operations of a general type. Embedded within the instructions may be coprocessor instructions. The processor 1010 may recognize these coprocessor instructions as being of a type that should be executed by the attached coprocessor 1045. Accordingly, the processor 1010 may issue these coprocessor instructions (or control signals representing coprocessor instructions), on a coprocessor bus or other interconnect, to coprocessor 1045. Coprocessor(s) 1045 may accept and execute the received coprocessor instructions.

FIG. 11 is a block diagram illustrating a first example system 1100, in accordance with one embodiment of the present disclosure. As shown in FIG. 11, multiprocessor system 1100 implements a point-to-point interconnect system. For example, system 1100 includes a first processor 1170 and a second processor 1180 coupled to each other via a point-to-point interconnect 1150. In some embodiments, each of processors 1170 and 1180 may be a version of the processor 900 illustrated in FIG. 9. In one embodiment, processors 1170 and 1180 may be implemented by respective processors 1010, while coprocessor 1138 may be implemented by a coprocessor 1045. In another embodiment, processors 1170 and 1180 may be implemented by a processor 1010 and a coprocessor 1045, respectively.

Processors 1170 and 1180 are shown including integrated memory controller (IMC) units 1172 and 1182, respectively. Processor 1170 also includes, as part of its bus controller units, point-to-point (P-P) interfaces 1176 and 1178. Similarly, processor 1180 includes P-P interfaces 1186 and 1188. Processors 1170 and 1180 may exchange information via a point-to-point (P-P) interface 1150 using P-P interface circuits 1178 and 1188. As shown in FIG. 11, IMCs 1172 and 1182 couple the processors to respective memories, shown as memory 1132 and memory 1134, which may be portions of a main memory that are locally attached to the respective processors.

Processors 1170 and 1180 may each exchange information with a chipset 1190 via individual P-P interfaces 1152 and 1154 respectively, using point to point interface circuits 1176, 1194, 1186, and 1198. Chipset 1190 may optionally exchange information with the coprocessor 1138 via interface 1192 over a high-performance interface 1139. In one embodiment, the coprocessor 1138 may be a special purpose processor, such as, for example, a high-throughput MIC processor, a network or communication processor, a compression engine, a graphics processor, a GPGPU, an embedded processor, or another type of special purpose processor. In one embodiment, coprocessor 1138 may include a high-performance graphics circuit and interface 1139 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1190 may be coupled to a first bus 1116 via an interface 1196. In various embodiments, first bus 1116 may be a Peripheral Component Interconnect (PCI) bus, a PCI Express bus, or another third generation I/O interconnect bus, although the scope of the present disclosure is not limited to these specific bus types.

As shown in FIG. 11, various I/O devices 1114 may be coupled to first bus 1116, along with a bus bridge 1118. Bus bridge 1118 may couple first bus 1116 to a second bus 1120. In one embodiment, one or more additional processor(s) 1115, such as one or more coprocessors, high-throughput MIC processors, GPGPU's, accelerators (e.g., graphics accelerators or digital signal processing (DSP) units), field programmable gate arrays, and/or any other processors, may be coupled to first bus 1116. In one embodiment, second bus 1120 may be a low pin count (LPC) bus. Various devices may be coupled to second bus 1120 including, for example, a keyboard and/or mouse 1122, one or more communication devices 1127 and a data storage unit 1128. Data storage unit 1128 may be a disk drive or another mass storage device, which may include instructions/code and data 1130, in one embodiment. In some embodiments, an audio I/O device 1124 may be coupled to the second bus 1120. Note that other architectures are possible. For example, instead of the point-to-point architecture illustrated in FIG. 11, a system may implement a multi-drop bus or another type of interconnect architecture.

FIG. 12 is a block diagram illustrating a second example system 1200, in accordance with one embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170 and 1180 may include integrated memory and I/O control logic ("CL") units 1272 and 1282, respectively. Thus, CL 1272 and CL 1282 may include integrated memory controller units and may also include I/O control logic. FIG. 12 illustrates that not only are the memories 1132 and 1134 coupled to CL 1272 and CL 1282, respectively, but I/O devices 1214 are also coupled to CL 1272 and CL 1282. In this example system, legacy I/O devices 1215 may also be coupled to the chipset 1190 via an interface 1196.

FIG. 13 is a block diagram illustrating a system on a chip (SoC) 1300, in accordance with one embodiment of the present disclosure. Similar elements in FIGS. 13 and 9 bear like reference numerals. Also, dashed lined boxes represent optional features on more advanced SoCs. In FIG. 13, one or more interconnect unit(s) 1302 are coupled to an application processor 1310, which includes a set of one or more cores 902A-902N, including respective local cache units 904A-904N, and shared cache unit(s) 906. The interconnect unit(s) 1302 are also coupled to a system agent unit 910, one or more bus controller unit(s) 916, one or more integrated memory controller unit(s) 914, a set of one or more coprocessors 1320, a static random access memory (SRAM) unit 1330, a direct memory access (DMA) unit 1332, and a display unit 1340 for coupling to one or more external displays. In one embodiment, the coprocessor(s) 1320 may include a special purpose processor, such as, for example, a network or communication processor, a compression engine, a GPGPU, a high-throughput MIC processor, an embedded processor, or another type of coprocessor. In another embodiment, the coprocessor(s) 1320 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and to generate output information. The output information may be applied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

Figure 14:
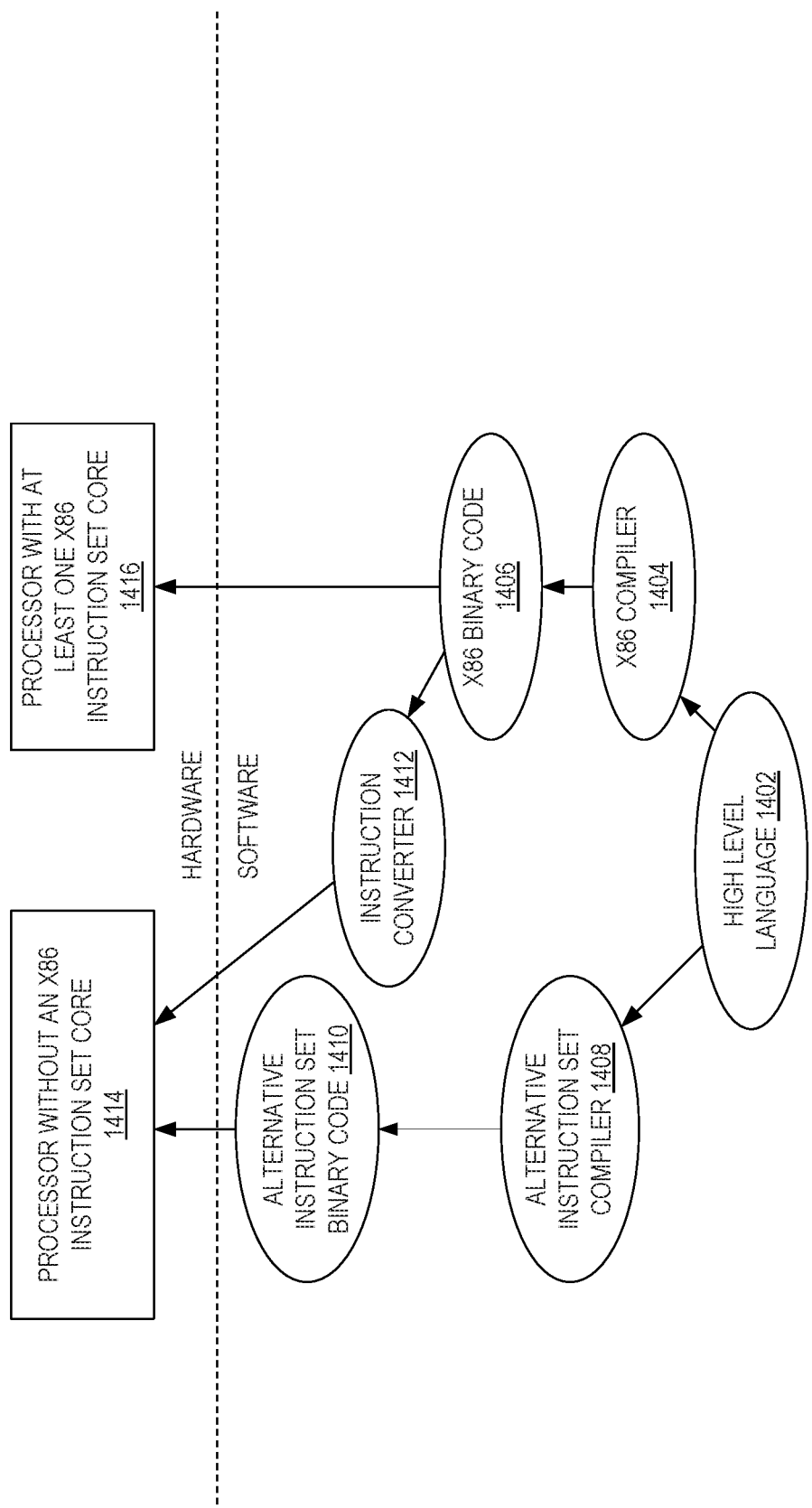
FIG. 14 is a block diagram illustrating the use of a compiler and a software instruction converter to convert binary instructions in a source instruction set to binary instructions in a target instruction set, according to some embodiments of the present disclosure.

FIG. 14 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 14 illustrates that a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that may be operable to generate x86 binary code 1406 (e.g., object code) that may, with or without additional linkage processing, be executed on the processor with at least one x86 instruction set core 1416. Similarly, FIG. 14 illustrates that the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1412 may be used to convert x86 binary code 1406 into code that may be natively executed by the processor without an x86 instruction set core 1414. This converted code might not be the same as the alternative instruction set binary code 1410; however, the converted code will accomplish the general operation and be made up of instructions from the alternative instruction set. Thus, instruction converter 1412 represents software, firmware, hardware, or a combination thereof that, through emulation, simulation or any other process, allows a processor or other electronic device that does not have an x86 instruction set processor or core to execute x86 binary code 1406.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a baseline branch predictor, and an empirical bias override circuit. The baseline branch predictor may be to receive data representing a branch instruction, the branch instruction being associated with a given address identifier, and to generate, based at least in part on a global branch history, an initial prediction of a branch direction for the branch instruction. The empirical bias override circuit may be to determine, dependent on a direction of an observed branch direction bias in a plurality of executed branch instruction instances associated with the given address identifier, whether the initial prediction is to be overridden, to determine, in response to a determination that the initial prediction is to be overridden, a final prediction of the branch direction for the branch instruction that matches the direction of the observed branch direction bias, to determine, in response to a determination that the initial prediction is not to be overridden, a final prediction of the branch direction for the branch instruction that matches the initial prediction, and to update, subsequent to identification of a resolved branch direction for the branch instruction following execution of the branch instruction, an entry in the global branch history to reflect the resolved branch direction for the branch instruction. The number of the plurality of executed branch instruction instances may be a predetermined number of executed branch instruction instances. In combination with any of the above embodiments, to determine whether the initial prediction is to be overridden, the empirical bias override circuit may be to obtain data representing an empirical bias fraction, the empirical bias fraction having been calculated as a percentage of the plurality of executed branch instruction instances associated with the given address identifier for which the resolved branch direction matches the direction of the observed branch direction bias, to obtain data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and to determine whether a difference between the empirical bias fraction and the predictor performance exceeds a predetermined performance difference threshold. In combination with any of the above embodiments, the empirical bias override circuit may be to override the initial prediction in response to a determination that the difference between the empirical bias fraction and the predictor performance exceeds a predetermined performance difference threshold and a determination that the direction of the observed branch direction bias is different than the initial prediction. In combination with any of the above embodiments, the empirical bias override circuit may be to refrain from overriding the initial prediction in response to a determination that the difference between the empirical bias fraction and the predictor performance does not exceed a predetermined performance difference threshold or a determination that the direction of the observed branch direction bias is the same as the initial prediction. In combination with any of the above embodiments, the empirical bias override circuit may be to read the data representing the empirical bias fraction from an entry in a data structure in a memory, the entry storing branch bias information for the branch instruction associated with the given address identifier, to read the data representing the predictor performance of the baseline branch predictor from the entry in the data structure, and to read data representing the direction of the observed branch direction bias from the entry in the data structure. In combination with any of the above embodiments, the processor may also be to store, in respective entries in a data structure in a memory, branch bias information for a plurality of branch instructions, each of which is associated with a respective address identifier. Each entry in the data structure may include a first field to store data representing an empirical bias fraction for one of the plurality of branch instructions, and a second field to store data representing a predictor performance for the one of the plurality of branch instructions. To determine whether the initial prediction is to be overridden, the empirical bias override circuit may be to obtain the data representing the empirical bias fraction and the data representing the predictor performance from an entry in the data structure storing branch bias information for branch instruction instances associated with the given address identifier. In combination with any of the above embodiments, the empirical bias override circuit may also be to determine, upon retirement of each branch instruction instance associated with the given address identifier, the direction of the observed branch direction bias for branch instruction instances associated with the given address identifier, and to calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the empirical bias override circuit may also be to calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct. In combination with any of the above embodiments, to determine whether the initial prediction is to be overridden, the empirical bias override circuit may also be to maintain a count of the number of executed branch instruction instances that are associated with the given address identifier, to compare the number of executed branch instruction instances that are associated with the given address identifier to a predetermined minimum occurrence threshold, and to determine, in response to a result of the comparison indicating that the number of executed branch instruction instances that are associated with the given address identifier is less than a predetermined minimum occurrence threshold, that the initial prediction is not to be overridden. In any of the above embodiments, the number of the plurality of executed branch instruction instances may be a predetermined number of executed branch instruction instances, and the predetermined number of executed branch instruction instances may be configurable at runtime. In combination with any of the above embodiments, the number of the plurality of executed branch instruction instances may be a predetermined number of executed branch instruction instances, the plurality of executed branch instruction instances may include executed branch instruction instances in a sliding window of executed branch instruction instances associated with the given address identifier, and the sliding window may have a width equal to the predetermined number of executed branch instruction instances. In combination with any of the above embodiments, the address identifier may include an instruction pointer value or a program counter value.

Some embodiments of the present disclosure include a method. In at least some of these embodiments, the method may include, in a processor, receiving data representing a branch instruction, the branch instruction being associated with a given address identifier, generating, based at least in part on a global branch history, an initial prediction of a branch direction for the branch instruction, determining, dependent on a direction of an observed branch direction bias in a plurality of executed branch instruction instances associated with the given address identifier, whether the initial prediction is to be overridden, determining, dependent on whether the initial prediction is to be overridden, a selected one of a final prediction of the branch direction for the branch instruction that matches the direction of the observed branch direction bias and a final prediction of the branch direction for the branch instruction that matches the initial prediction, and updating, subsequent to identifying a resolved branch direction for the branch instruction following execution of the branch instruction, an entry in the global branch history to reflect the resolved branch direction for the branch instruction. The number of the plurality of executed branch instruction instances may be a predetermined number of executed branch instruction instances. In combination with any of the above embodiments, determining whether the initial prediction is to be overridden may include obtaining data representing an empirical bias fraction, the empirical bias fraction having been calculated as a percentage of the plurality of executed branch instruction instances associated with the given address identifier for which the resolved branch direction matches the direction of the observed branch direction bias, obtaining data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and determining whether a difference between the empirical bias fraction and the predictor performance exceeds a predetermined performance difference threshold. In combination with any of the above embodiments, the method may also include overriding the initial prediction in response to determining that the difference between the empirical bias fraction and the predictor performance exceeds a predetermined performance difference threshold and a determination that the direction of the observed branch direction bias is different than the initial prediction. In combination with any of the above embodiments, the method may also include refraining from overriding the initial prediction in response to determining that the difference between the empirical bias fraction and the predictor performance does not exceed a predetermined performance difference threshold or a determination that the direction of the observed branch direction bias is the same as the initial prediction. In combination with any of the above embodiments, the method may also include reading the data representing the empirical bias fraction from an entry in a data structure in a memory, the entry storing branch bias information for the branch instruction associated with the given address identifier, reading the data representing the predictor performance of the baseline branch predictor from the entry in the data structure, and reading data representing the direction of the observed branch direction bias from the entry in the data structure. In combination with any of the above embodiments, determining whether the initial prediction is to be overridden may also include obtaining the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier. In combination with any of the above embodiments, the method may also include determining, upon retirement of each branch instruction instance associated with the given address identifier, the direction of the observed branch direction bias for branch instruction instances associated with the given address identifier, and calculating, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the method may also include calculating, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct. In combination with any of the above embodiments, determining whether the initial prediction is to be overridden may also include maintaining a count of the number of executed branch instruction instances that are associated with the given address identifier, comparing the number of executed branch instruction instances that are associated with the given address identifier to a predetermined minimum occurrence threshold, and determining, in response to a result of the comparing indicating that the number of executed branch instruction instances that are associated with the given address identifier is less than a predetermined minimum occurrence threshold, that the initial prediction is not to be overridden. In any of the above embodiments, the number of the plurality of executed branch instruction instances may be a predetermined number of executed branch instruction instances, and the predetermined number of executed branch instruction instances may be configurable at runtime. In combination with any of the above embodiments, the number of the plurality of executed branch instruction instances may be a predetermined number of executed branch instruction instances, the plurality of executed branch instruction instances may include executed branch instruction instances in a sliding window of executed branch instruction instances associated with the given address identifier, and the sliding window may have a width equal to the predetermined number of executed branch instruction instances. In combination with any of the above embodiments, the address identifier may include an instruction pointer value or a program counter value.

Some embodiments of the present disclosure include a branch predictor. In at least some of these embodiments, the branch predictor may include a baseline branch predictor, and an empirical bias override circuit. The baseline branch predictor may be to receive data representing a branch instruction, the branch instruction being associated with a given address identifier, and to generate, based at least in part on a global branch history, an initial prediction of a branch direction for the branch instruction. The empirical bias override circuit may be to determine, dependent on a direction of an observed branch direction bias in a plurality of executed branch instruction instances associated with the given address identifier, whether the initial prediction is to be overridden, to determine, in response to a determination that the initial prediction is to be overridden, a final prediction of the branch direction for the branch instruction that matches the direction of the observed branch direction bias, to determine, in response to a determination that the initial prediction is not to be overridden, a final prediction of the branch direction for the branch instruction that matches the initial prediction, and to update, subsequent to identification of a resolved branch direction for the branch instruction following execution of the branch instruction, an entry in the global branch history to reflect the resolved branch direction for the branch instruction. The number of the plurality of executed branch instruction instances may be a predetermined number of executed branch instruction instances. In combination with any of the above embodiments, to determine whether the initial prediction is to be overridden, the empirical bias override circuit may be to obtain data representing an empirical bias fraction, the empirical bias fraction having been calculated as a percentage of the plurality of executed branch instruction instances associated with the given address identifier for which the resolved branch direction matches the direction of the observed branch direction bias, to obtain data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and to determine whether a difference between the empirical bias fraction and the predictor performance exceeds a predetermined performance difference threshold. In combination with any of the above embodiments, the empirical bias override circuit may be to override the initial prediction in response to a determination that the difference between the empirical bias fraction and the predictor performance exceeds a predetermined performance difference threshold and a determination that the direction of the observed branch direction bias is different than the initial prediction. In combination with any of the above embodiments, the empirical bias override circuit may be to refrain from overriding the initial prediction in response to a determination that the difference between the empirical bias fraction and the predictor performance does not exceed a predetermined performance difference threshold or a determination that the direction of the observed branch direction bias is the same as the initial prediction. In combination with any of the above embodiments, the empirical bias override circuit may be to read the data representing the empirical bias fraction from an entry in a data structure in a memory, the entry storing branch bias information for the branch instruction associated with the given address identifier, to read the data representing the predictor performance of the baseline branch predictor from the entry in the data structure, and to read data representing the direction of the observed branch direction bias from the entry in the data structure. In combination with any of the above embodiments, to determine whether the initial prediction is to be overridden, the empirical bias override circuit may be to obtain the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier. In combination with any of the above embodiments, the empirical bias override circuit may also be to determine, upon retirement of each branch instruction instance associated with the given address identifier, the direction of the observed branch direction bias for branch instruction instances associated with the given address identifier, and to calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the empirical bias override circuit may also be to calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction generated by the baseline branch predictor was correct. In combination with any of the above embodiments, to determine whether the initial prediction is to be overridden, the empirical bias override circuit may also be to maintain a count of the number of executed branch instruction instances that are associated with the given address identifier, to compare the number of executed branch instruction instances that are associated with the given address identifier to a predetermined minimum occurrence threshold, and to determine, in response to a result of the comparison indicating that the number of executed branch instruction instances that are associated with the given address identifier is less than a predetermined minimum occurrence threshold, that the initial prediction is not to be overridden. In any of the above embodiments, the number of the plurality of executed branch instruction instances may be a predetermined number of executed branch instruction instances, and the predetermined number of executed branch instruction instances may be configurable at runtime. In combination with any of the above embodiments, the number of the plurality of executed branch instruction instances may be a predetermined number of executed branch instruction instances, the plurality of executed branch instruction instances may include executed branch instruction instances in a sliding window of executed branch instruction instances associated with the given address identifier, and the sliding window may have a width equal to the predetermined number of executed branch instruction instances. In combination with any of the above embodiments, the address identifier may include an instruction pointer value or a program counter value.

Some embodiments of the present disclosure include a system. In at least some of these embodiments, the system may include means for receiving data representing a branch instruction, the branch instruction being associated with a given address identifier, means for generating, based at least in part on a global branch history, an initial prediction of a branch direction for the branch instruction, means for determining, dependent on a direction of an observed branch direction bias in a plurality of executed branch instruction instances associated with the given address identifier, whether the initial prediction is to be overridden, means for determining, dependent on whether the initial prediction is to be overridden, a selected one of a final prediction of the branch direction for the branch instruction that matches the direction of the observed branch direction bias and a final prediction of the branch direction for the branch instruction that matches the initial prediction, and means for updating, subsequent to identification of a resolved branch direction for the branch instruction following execution of the branch instruction, an entry in the global branch history to reflect the resolved branch direction for the branch instruction. The number of the plurality of executed branch instruction instances may be a predetermined number of executed branch instruction instances. In combination with any of the above embodiments, the means for determining whether the initial prediction is to be overridden may include means for obtaining data representing an empirical bias fraction, the empirical bias fraction having been calculated as a percentage of the plurality of executed branch instruction instances associated with the given address identifier for which the resolved branch direction matches the direction of the observed branch direction bias, means for obtaining data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and means for determining whether a difference between the empirical bias fraction and the predictor performance exceeds a predetermined performance difference threshold. In combination with any of the above embodiments, the system may also include means for overriding the initial prediction in response to determining that the difference between the empirical bias fraction and the predictor performance exceeds a predetermined performance difference threshold and a determination that the direction of the observed branch direction bias is different than the initial prediction. In combination with any of the above embodiments, the system may also include means for refraining from overriding the initial prediction in response to determining that the difference between the empirical bias fraction and the predictor performance does not exceed a predetermined performance difference threshold or a determination that the direction of the observed branch direction bias is the same as the initial prediction. In combination with any of the above embodiments, the system may also include means for reading the data representing the empirical bias fraction from an entry in a data structure in a memory, the entry storing branch bias information for the branch instruction associated with the given address identifier, means for reading the data representing the predictor performance of the baseline branch predictor from the entry in the data structure, and means for reading data representing the direction of the observed branch direction bias from the entry in the data structure. In combination with any of the above embodiments, the means for determining whether the initial prediction is to be overridden may also include means for obtaining the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier. In combination with any of the above embodiments, the system may also include means for determining, upon retirement of each branch instruction instance associated with the given address identifier, the direction of the observed branch direction bias for branch instruction instances associated with the given address identifier, and means for calculating, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the system may also include means for calculating, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct. In combination with any of the above embodiments, the means for determining whether the initial prediction is to be overridden may also include means for maintaining a count of the number of executed branch instruction instances that are associated with the given address identifier, means for comparing the number of executed branch instruction instances that are associated with the given address identifier to a predetermined minimum occurrence threshold, and means for determining, in response to a result of the comparing indicating that the number of executed branch instruction instances that are associated with the given address identifier is less than a predetermined minimum occurrence threshold, that the initial prediction is not to be overridden. In any of the above embodiments, the number of the plurality of executed branch instruction instances may be a predetermined number of executed branch instruction instances, and the predetermined number of executed branch instruction instances may be configurable at runtime. In combination with any of the above embodiments, the number of the plurality of executed branch instruction instances may be a predetermined number of executed branch instruction instances, the plurality of executed branch instruction instances may include executed branch instruction instances in a sliding window of executed branch instruction instances associated with the given address identifier, and the sliding window may have a width equal to the predetermined number of executed branch instruction instances. In combination with any of the above embodiments, the address identifier may include an instruction pointer value or a program counter value.

Some embodiments of the present disclosure include a system. In at least some of these embodiments, the system may include a baseline branch prediction circuit, and an empirical bias override circuit. The baseline branch predictor may be to receive data representing a branch instruction, the branch instruction being associated with a given address identifier, and to generate, based at least in part on a global branch history, an initial prediction of a branch direction for the branch instruction. The empirical bias override circuit may be to determine, dependent on an observed branch direction bias in a plurality of executed branch instruction instances associated with the given address identifier, whether the initial prediction may be to be overridden, to determine, in response to a determination that the initial prediction may be to be overridden, a final prediction of the branch direction for the branch instruction that matches the direction of the observed branch direction bias, to determine, in response to a determination that the initial prediction is not to be overridden, a final prediction of the branch direction for the branch instruction that matches the initial prediction, and to update, subsequent to identification of a resolved branch direction for the branch instruction following execution of the branch instruction, an entry in the global branch history to reflect the resolved branch direction for the branch instruction. In combination with any of the above embodiments, to determine whether the initial prediction may be to be overridden, the empirical bias override circuit may be to obtain data representing an empirical bias fraction, the empirical bias fraction having been calculated as a percentage of the plurality of executed branch instruction instances associated with the given address identifier for which the resolved branch direction matches the direction of the observed branch direction bias, to obtain data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and to determine whether a difference between the empirical bias fraction and the predictor performance exceeds a predetermined performance difference threshold. In combination with any of the above embodiments, the empirical bias override circuit may be to override the initial prediction in response to a determination that the difference between the empirical bias fraction and the predictor performance exceeds a predetermined performance difference threshold and a determination that the direction of the observed branch direction bias is different than the initial prediction. In combination with any of the above embodiments, the empirical bias override circuit may be to refrain from overriding the initial prediction in response to a determination that the difference between the empirical bias fraction and the predictor performance does not exceed a predetermined performance difference threshold or a determination that the direction of the observed branch direction bias is the same as the initial prediction. In combination with any of the above embodiments, the empirical bias override circuit may be to read the data representing the empirical bias fraction from an entry in a data structure in a memory, the entry storing branch bias information for the branch instruction associated with the given address identifier, to read the data representing the predictor performance of the baseline branch predictor from the entry in the data structure, and to read data representing the direction of the observed branch direction bias from the entry in the data structure. In combination with any of the above embodiments, to determine whether the initial prediction may be to be overridden, the empirical bias override circuit may be to obtain the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier. In combination with any of the above embodiments, the empirical bias override circuit may be further to determine, upon retirement of each branch instruction instance associated with the given address identifier, the direction of the observed branch direction bias for branch instruction instances associated with the given address identifier, and to calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the empirical bias override circuit may be further to calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction generated by the baseline branch predictor was correct. In combination with any of the above embodiments, to determine whether the initial prediction may be to be overridden, the empirical bias override circuit may be further to maintain a count of the number of executed branch instruction instances that are associated with the given address identifier, to compare the number of executed branch instruction instances that are associated with the given address identifier to a predetermined minimum occurrence threshold, and to determine, in response to a result of the comparison indicating that the number of executed branch instruction instances that are associated with the given address identifier is less than a predetermined minimum occurrence threshold, that the initial prediction is not to be overridden. In combination with any of the above embodiments, the number of the plurality of executed branch instruction instances is a predetermined number of executed branch instruction instances, and the predetermined number of executed branch instruction instances is configurable at runtime. In combination with any of the above embodiments, the number of the plurality of executed branch instruction instances is a predetermined number of executed branch instruction instances, and the plurality of executed branch instruction instances may include executed branch instruction instances in a sliding window of executed branch instruction instances associated with the given address identifier, the sliding window having a width equal to the predetermined number of executed branch instruction instances. In combination with any of the above embodiments, the address identifier may include an instruction pointer value or a program counter value.

Some embodiments of the present disclosure include at least one non-transitory machine readable storage medium, comprising computer-executable instructions carried on the machine readable medium, the instructions readable by a processor. In at least some of these embodiments, the instructions, when read and executed, may be for causing the processor to receive data representing a branch instruction, the branch instruction being associated with a given address identifier, to generate, based at least in part on a global branch history, an initial prediction of a branch direction for the branch instruction, to determine, dependent on an observed branch direction bias in a plurality of executed branch instruction instances associated with the given address identifier, whether the initial prediction may be to be overridden, to determine, dependent on whether the initial prediction may be to be overridden, a selected one of a final prediction of the branch direction for the branch instruction that matches the direction of the observed branch direction bias and a final prediction of the branch direction for the branch instruction that matches the initial prediction, and to update, subsequent to identifying a resolved branch direction for the branch instruction following execution of the branch instruction, an entry in the global branch history to reflect the resolved branch direction for the branch instruction. In combination with any of the above embodiments, to determine whether the initial prediction may be to be overridden, the instructions may further cause the processor to obtain data representing an empirical bias fraction, the empirical bias fraction having been calculated as a percentage of the plurality of executed branch instruction instances associated with the given address identifier for which the resolved branch direction matches the direction of the observed branch direction bias, to obtain data representing a predictor performance of the baseline branch predictor, the predictor performance having been calculated as a percentage of the plurality of executed branch instruction instances associated with the given address identifier for which an initial prediction of a branch direction generated by the baseline branch predictor was correct, and to determine whether a difference between the empirical bias fraction and the predictor performance exceeds a predetermined performance difference threshold. In combination with any of the above embodiments, the instructions may further cause the processor to override the initial prediction in response to determining that the difference between the empirical bias fraction and the predictor performance exceeds a predetermined performance difference threshold and a determination that the direction of the observed branch direction bias is different than the initial prediction. In combination with any of the above embodiments, the instructions may further cause the processor to refrain from overriding the initial prediction in response to determining that the difference between the empirical bias fraction and the predictor performance does not exceed a predetermined performance difference threshold or a determination that the direction of the observed branch direction bias is the same as the initial prediction. In combination with any of the above embodiments, the instructions may further cause the processor to read the data representing the empirical bias fraction from an entry in a data structure in a memory, the entry storing branch bias information for the branch instruction associated with the given address identifier, to read the data representing the predictor performance of the baseline branch predictor from the entry in the data structure, and to read data representing the direction of the observed branch direction bias from the entry in the data structure. In combination with any of the above embodiments, to determine whether the initial prediction may be to be overridden, the instructions may further cause the processor to obtain the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier. In combination with any of the above embodiments, the instructions may further cause the processor to determine, upon retirement of each branch instruction instance associated with the given address identifier, the direction of the observed branch direction bias for branch instruction instances associated with the given address identifier, and to calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias. In combination with any of the above embodiments, the instructions may further cause the processor to calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct. In combination with any of the above embodiments, to determine whether the initial prediction may be to be overridden, the instructions may further cause the processor to maintain a count of the number of executed branch instruction instances that are associated with the given address identifier, to compare the number of executed branch instruction instances that are associated with the given address identifier to a predetermined minimum occurrence threshold, and to determine, in response to a result of the comparing indicating that the number of executed branch instruction instances that are associated with the given address identifier is less than a predetermined minimum occurrence threshold, that the initial prediction is not to be overridden. In combination with any of the above embodiments, the number of the plurality of executed branch instruction instances is a predetermined number of executed branch instruction instances, and the predetermined number of executed branch instruction instances is configurable at runtime. In combination with any of the above embodiments, the number of the plurality of executed branch instruction instances is a predetermined number of executed branch instruction instances, and the plurality of executed branch instruction instances may include executed branch instruction instances in a sliding window of executed branch instruction instances associated with the given address identifier, the sliding window having a width equal to the predetermined number of executed branch instruction instances. In combination with any of the above embodiments, the address identifier may include an instruction pointer value or a program counter value.

What is claimed is:

1. A processor, comprising:
a baseline branch predictor; and
an empirical branch bias override circuit;
wherein:
the baseline branch predictor comprises hardware circuitry to:
receive data representing a branch instruction, the branch instruction being associated with a given address identifier; and
generate, based at least in part on a global branch history, an initial prediction of a branch direction for the branch instruction;
the empirical branch bias override circuit is to:
determine whether the initial prediction is to be overridden based on an empirical bias fraction indicating a measure of an observed branch direction bias in a plurality of executed branch instruction instances associated with the given address identifier and a predictor performance indicating a measure of accuracy in previous initial predictions made by the baseline branch predictor;
determine, in response to a determination that the initial prediction is to be overridden, a final prediction of the branch direction for the branch instruction that matches a direction of the observed branch direction bias;
determine, in response to a determination that the initial prediction is not to be overridden, a final prediction of the branch direction for the branch instruction that matches the initial prediction; and
update, subsequent to identification of a resolved branch direction for the branch instruction following execution of the branch instruction, an entry in the global branch history to reflect the resolved branch direction for the branch instruction.

2. The processor of claim 1, wherein to determine whether the initial prediction into be overridden, the empirical branch bias override circuit is to:
obtain data representing the empirical bias fraction, the empirical bias fraction having been calculated as a percentage of the plurality of executed branch instruction instances associated with the given address identifier for which the resolved branch direction matches the direction of the observed branch direction bias;
obtain data representing the predictor performance of the baseline branch predictor, the predictor performance having been calculated as a percentage of the plurality of executed branch instruction instances associated with the given address identifier for which an initial prediction of a branch direction generated by the baseline branch predictor was correct; and
determine whether a difference between the empirical bias fraction and the predictor performance exceeds a predetermined performance difference threshold.

3. The processor of claim 2, wherein:
the processor is further to store, in respective entries in a data structure in a memory, branch bias information for a plurality of branch instructions, each of which is associated with a respective address identifier;
each entry in the data structure comprises:
a first field to store data representing an empirical bias fraction for one of the plurality of branch instructions; and
a second field to store data representing a predictor performance for the one of the plurality of branch instructions;
to determine whether the initial prediction is to be overridden, the empirical branch bias override circuit is to:
obtain the data representing the empirical bias fraction and the data representing the predictor performance from an entry in the data structure storing branch bias information for branch instruction instances associated with the given address identifier.

4. The processor of claim 3, wherein the empirical branch bias override circuit is further to:
determine, upon retirement of each branch instruction instance associated with the given address identifier, the direction of the observed branch direction bias for branch instruction instances associated with the given address identifier; and
calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias.

5. The processor of claim 3, wherein the empirical branch bias override circuit is further to:
calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct.

6. The processor of claim 1, wherein to determine whether the initial prediction is to be overridden, the empirical branch bias override circuit is further to:
maintain a count of the number of executed branch instruction instances that are associated with the given address identifier;
compare the number of executed branch instruction instances that are associated with the given address identifier to a predetermined minimum occurrence threshold; and
determine, in response to a result of the comparison indicating that the number of executed branch instruction instances that are associated with the given address identifier is less than a predetermined minimum occurrence threshold, that the initial prediction is not to be overridden.

7. The processor of claim 1, wherein:
the number of the plurality of executed branch instruction instances is a predetermined number of executed branch instruction instances; and
the predetermined number of executed branch instruction instances is configurable at runtime.

8. The processor of claim 1, wherein:
the number of the plurality of executed branch instruction instances is a predetermined number of executed branch instruction instances; and
the plurality of executed branch instruction instances comprises executed branch instruction instances in a sliding window of executed branch instruction instances associated with the given address identifier, the sliding window having a width equal to the predetermined number of executed branch instruction instances.

9. A method comprising, in a processor:
receiving data representing a branch instruction, the branch instruction being associated with a given address identifier;
generating, based at least in part on a global branch history, an initial prediction of a branch direction for the branch instruction;
determining whether the initial prediction is to be overridden based on an empirical bias fraction indicating a measure of an observed branch direction bias in a plurality of executed branch instruction instances associated with the given address identifier and a predictor performance indicating a measure of accuracy in previous initial predictions made by the baseline branch predictor;
determining, dependent on whether the initial prediction is to be overridden, a selected one of a final prediction of the branch direction for the branch instruction that matches a direction of the observed branch direction bias and a final prediction of the branch direction for the branch instruction that matches the initial prediction; and
updating, subsequent to identifying a resolved branch direction for the branch instruction following execution of the branch instruction, an entry in the global branch history to reflect the resolved branch direction for the branch instruction.

10. The method of claim 9, wherein determining whether the initial prediction into be overridden comprises:
obtaining data representing the empirical bias fraction, the empirical bias fraction having been calculated as a percentage of the plurality of executed branch instruction instances associated with the given address identifier for which the resolved branch direction matches the direction of the observed branch direction bias;
obtaining data representing the predictor performance of the baseline branch predictor, the predictor performance having been calculated as a percentage of the plurality of executed branch instruction instances associated with the given address identifier for which an initial prediction of a branch direction generated by the baseline branch predictor was correct; and
determining whether a difference between the empirical bias fraction and the predictor performance exceeds a predetermined performance difference threshold.

11. The method of claim 10, wherein determining whether the initial prediction is to be overridden further comprises:
obtaining the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier.

12. The method of claim 11, further comprising:
determining, upon retirement of each branch instruction instance associated with the given address identifier, the direction of the observed branch direction bias for branch instruction instances associated with the given address identifier; and
calculating, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias.

13. The method of claim 11, further comprising:
calculating, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction determined by the baseline branch predictor was correct.

14. The method of claim 9, wherein determining whether the initial prediction is to be overridden further comprises:
maintaining a count of the number of executed branch instruction instances that are associated with the given address identifier;
comparing the number of executed branch instruction instances that are associated with the given address identifier to a predetermined minimum occurrence threshold; and
determining, in response to a result of the comparing indicating that the number of executed branch instruction instances that are associated with the given address identifier is less than a predetermined minimum occurrence threshold, that the initial prediction is not to be overridden.

15. A system, comprising:
an instruction stream comprising a plurality of instructions;
a baseline branch predictor; and
an empirical branch bias override circuit;
wherein:
the baseline branch predictor comprises hardware circuitry to:
receive data representing a branch instruction from the instruction stream, the branch instruction being associated with a given address identifier; and
generate, based at least in part on a global branch history, an initial prediction of a branch direction for the branch instruction;
the empirical branch bias override circuit is to:
determine whether the initial prediction is to be overridden based on an empirical bias fraction indicating a measure of an observed branch direction bias in a plurality of executed branch instruction instances associated with the given address identifier and a predictor performance indicating a measure of accuracy in previous initial predictions made by the baseline branch predictor;

determine, in response to a determination that the initial prediction is to be overridden, a final prediction of the branch direction for the branch instruction that matches a direction of the observed branch direction bias;

determine, in response to a determination that the initial prediction is not to be overridden, a final prediction of the branch direction for the branch instruction that matches the initial prediction; and update, subsequent to identification of a resolved branch direction for the branch instruction following execution of the branch instruction, an entry in the global branch history to reflect the resolved branch direction for the branch instruction.

16. The system of claim 15, wherein to determine whether the initial prediction into be overridden, the empirical branch bias override circuit is to:

obtain data representing the empirical bias fraction, the empirical bias fraction having been calculated as a percentage of the plurality of executed branch instruction instances associated with the given address identifier for which the resolved branch direction matches the direction of the observed branch direction bias;

obtain data representing the predictor performance of the baseline branch predictor, the predictor performance having been calculated as a percentage of the plurality of executed branch instruction instances associated with the given address identifier for which an initial prediction of a branch direction generated by the baseline branch predictor was correct; and determine whether a difference between the empirical bias fraction and the predictor performance exceeds a predetermined performance difference threshold.

17. The system of claim 16, wherein to determine whether the initial prediction is to be overridden, the empirical branch bias override circuit is to:

obtain the data representing the empirical bias fraction and the data representing the predictor performance from an entry in a data structure in a memory storing branch bias information for branch instruction instances associated with the given address identifier, the data structure storing, in respective entries, branch bias information for a plurality of branch instructions, each of which is associated with a respective address identifier.

18. The system of claim 17, wherein the empirical branch bias override circuit is further to:

determine, upon retirement of each branch instruction instance associated with the given address identifier, the direction of the observed branch direction bias for branch instruction instances associated with the given address identifier; and calculate, upon retirement of each branch instruction instance associated with the given address identifier, the empirical bias fraction for branch instruction instances associated with the given address identifier as a percentage of the plurality of executed branch instruction instances associated with the given address identifier for which the resolved branch direction matches the direction of the observed branch direction bias.

19. The system of claim 17, wherein the empirical branch bias override circuit is further to:

calculate, upon retirement of each branch instruction instance associated with the given address identifier, the predictor performance of the baseline branch predictor for branch instruction instances associated with the given address identifier as a percentage of the plurality of executed branch instruction instances associated with the given address identifier for which an initial prediction of a branch direction generated by the baseline branch predictor was correct.

20. The system of claim 15, wherein to determine whether the initial prediction is to be overridden, the empirical branch bias override circuit is further to:

maintain a count of the number of executed branch instruction instances that are associated with the given address identifier;

compare the number of executed branch instruction instances that are associated with the given address identifier to a predetermined minimum occurrence threshold; and determine, in response to a result of the comparison indicating that the number of executed branch instruction instances that are associated with the given address identifier is less than a predetermined minimum occurrence threshold, that the initial prediction is not to be overridden.

* * * * *